United States Patent
Karaki et al.

(10) Patent No.: US 11,843,938 B2
(45) Date of Patent: *Dec. 12, 2023

(54) SENSING PROCEDURES IN A WIRELESS COMMUNICATION NETWORK

(71) Applicant: Telefonaktiebolaget LM Ericsson (publ), Stockholm (SE)

(72) Inventors: Reem Karaki, Aachen (DE); Jung-Fu Cheng, Fremont, CA (US); Havish Koorapaty, Saratoga, CA (US)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 17/867,186

(22) Filed: Jul. 18, 2022

(65) Prior Publication Data

US 2022/0353912 A1 Nov. 3, 2022

Related U.S. Application Data

(63) Continuation of application No. 16/968,964, filed as application No. PCT/SE2019/050124 on Feb. 14, 2019, now Pat. No. 11,425,754.

(Continued)

(51) Int. Cl.
*H04W 74/08* (2009.01)
*H04L 1/1822* (2023.01)
(Continued)

(52) U.S. Cl.
CPC ........ *H04W 74/0808* (2013.01); *H04L 1/188* (2013.01); *H04L 1/1822* (2013.01); *H04W 16/14* (2013.01)

(58) Field of Classification Search
CPC ............. H04W 74/08; H04W 74/0808; H04W 74/0833; H04W 72/0406; H04W 72/0413;
(Continued)

(56) References Cited

U.S. PATENT DOCUMENTS

2017/0019909 A1 1/2017 Si et al.
2017/0280475 A1 9/2017 Yerramalli et al.
(Continued)

FOREIGN PATENT DOCUMENTS

CO 10041183 4/2011
GB 2507786 A 5/2014
(Continued)

OTHER PUBLICATIONS

International Search Report and Written Opinion dated May 13, 2019 for International Application No. PCT/SE2019/050124 filed on Feb. 14, 2019, consisting of 14-pages.
(Continued)

*Primary Examiner* — Peter Chen
(74) *Attorney, Agent, or Firm* — Christopher & Weisberg, P.A.

(57) ABSTRACT

Embodiments herein relate to a method performed by a first communication node operating in a wireless communications network. The first communication node adjusts a value of a Contention Window, CW, from a first value to a second value, the second value being a higher value than the first value, wherein adjusting the value is based on: one or more feedback timers having expired at a time of performing a sensing procedure in the absence of: a) a received uplink, UL, grant from a second communication node, or b) a downlink feedback from the second communication node for an Autonomous Uplink, AUL, transmission from the first communication node. Following adjusting the value, the first communication node initiates a sensing procedure performed prior to a transmission of an UL burst to the second communication node, wherein the sensing procedure uses the adjusted value of the CW.

19 Claims, 14 Drawing Sheets

Related U.S. Application Data

(60) Provisional application No. 62/710,367, filed on Feb. 16, 2018.

(51) Int. Cl.
  *H04L 1/1867* (2023.01)
  *H04W 16/14* (2009.01)

(58) Field of Classification Search
  CPC ........... H04W 72/042; H04W 72/1278; H04W 72/1284; H04W 72/1289; H04W 72/14; H04W 76/27; H04W 24/10; H04W 16/14; H04L 1/18; H04L 1/1822; H04L 1/1867; H04L 1/187; H04L 1/188; H04L 1/1883; H04L 1/1829; H04L 1/1832; H04L 1/1848; H04L 1/1851; H04L 5/0053; H04L 47/27
  See application file for complete search history.

(56) References Cited

U.S. PATENT DOCUMENTS

| | | | |
|---|---|---|---|
| 2019/0159256 A1 | 5/2019 | Talarico et al. | |
| 2020/0053777 A1 | 2/2020 | Babaei et al. | |
| 2020/0288498 A1 | 9/2020 | Li et al. | |
| 2020/0374933 A1 | 11/2020 | Lou et al. | |

FOREIGN PATENT DOCUMENTS

| | | | |
|---|---|---|---|
| IN | 202017013076 A | 8/2020 | |
| WO | 2017007391 A1 | 1/2017 | |
| WO | 2017007397 A1 | 1/2017 | |
| WO | 2017191617 A1 | 11/2017 | |
| WO | 2018029659 A1 | 2/2018 | |
| WO | 2019056368 A1 | 3/2019 | |

OTHER PUBLICATIONS

ETSI EN 301 893 V1.7.1; Broadband Radio Access Networks (BRAN); 5 GHz high performance RLAN; Harmonized EN covering the essential requirements of article 3.2 of the R&TTE Directive; Jun. 2012, France, consisting of 90-pages.

3GPP TS 36.213 V12.3.0; 3rd Generation Partnership Project; Technical Specification Group Radio Access Network; Evolved Universal Terrestrial Radio Access (E-UTRA); Physical layer procedures (Release 12); Sep. 2014, consisting of 212-pages.

3GPP TS 36.321 V12.1.0; 3rd Generation Partnership Project; Technical Specification Group Radio Access Network; Evolved Universal Terrestrial Radio Access (E-UTRA); Medium Access Control (MAC) protocol specification (Release 12); Mar. 2014, consisting of 57-pages.

3GPP TSG-RAN WG1 Meeting #91 R1-1720374; Title; on AUL Channel Access; Source: Ericsson; Agenda Item: 6.2.2.2.3; Document for: Discussion and Decision; Date and Locatin: Nov. 27-Dec. 1, 2017, Reno, USA, consisting of 8-pages.

EPO Communication and European Search Report dated Oct. 15, 2021 for Patent Application No. 19720022.3, consisting of 7-pages.

Indian Office Action dated Sep. 15, 2021 for Patent Application No. 202047039346, consisting of 8-pages.

Colombian Office Action and English translation dated Jun. 23, 2023 for Application No. NC2020/0010030, consisting of 35 pages.

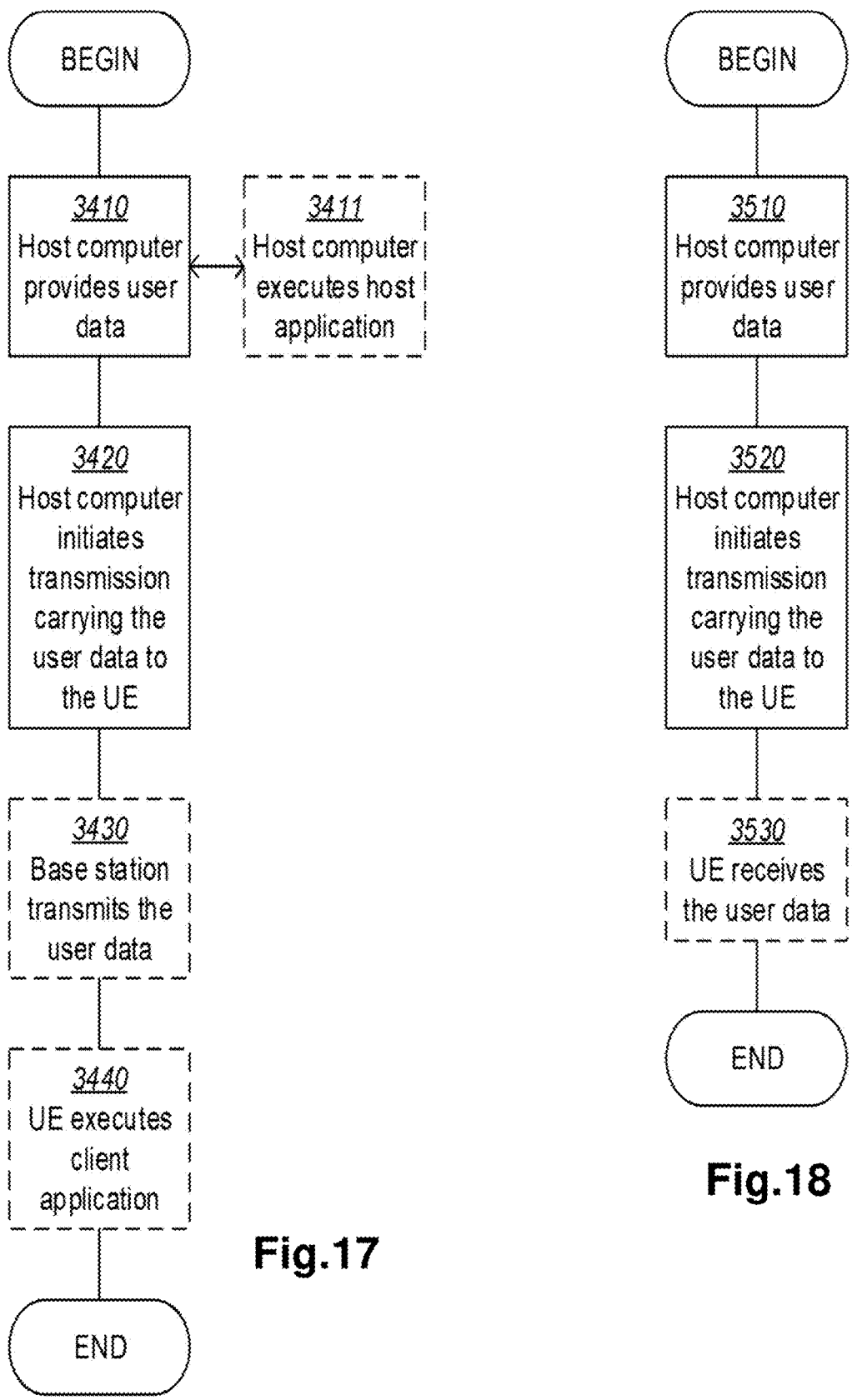

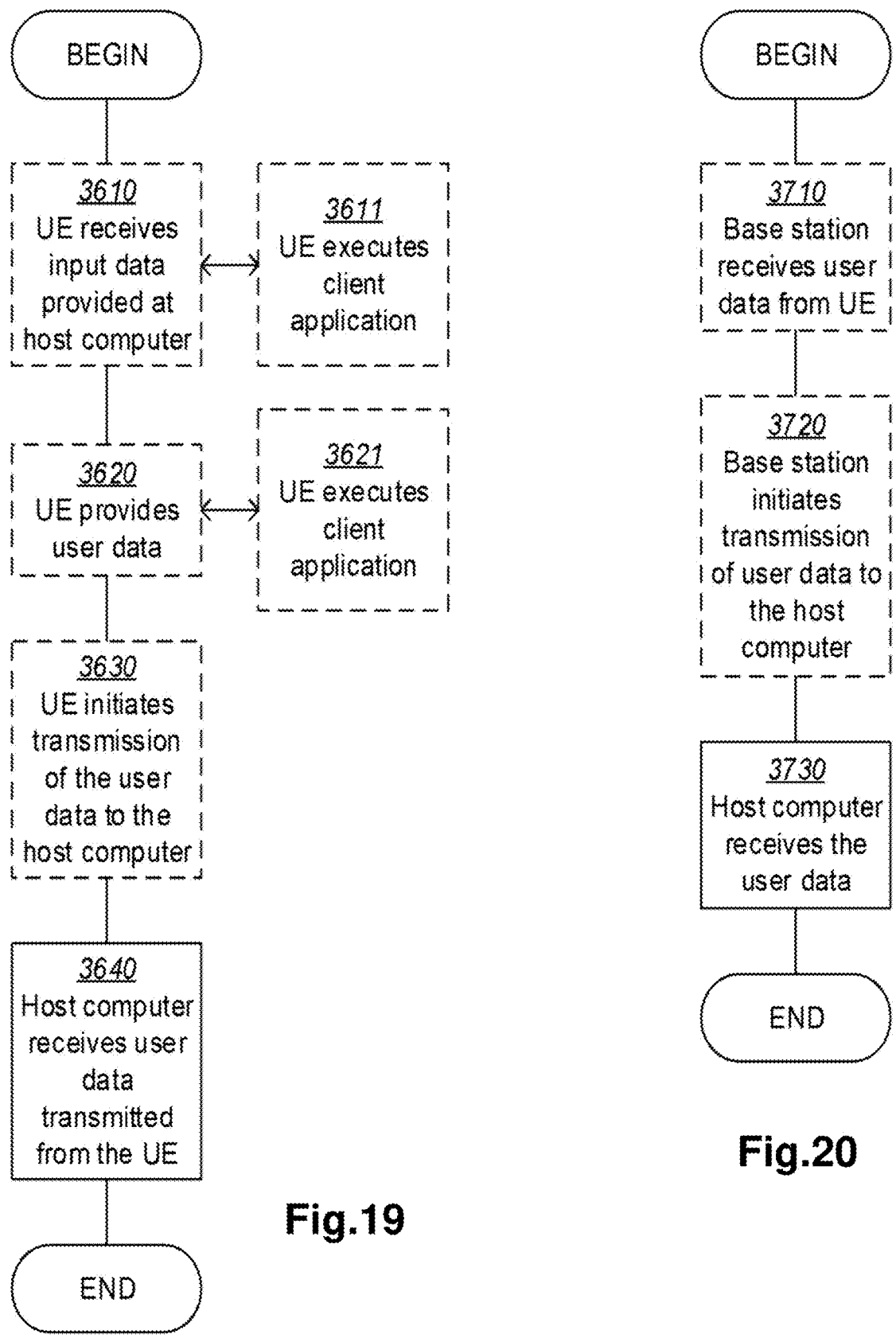

SENSING PROCEDURES IN A WIRELESS COMMUNICATION NETWORK

CROSS-REFERENCE TO RELATED APPLICATIONS

This application is a Continuation of U.S. application Ser. No. 16/968,964 (now issued as U.S. Pat. No. 11,425,754), filed Aug. 11, 2020, which is a National Stage Application of International Application No. PCT/SE2019/050124, filed Feb. 14, 2019, which claims the benefit of U.S. Provisional Application No. 62/710,367, filed on Feb. 16, 2018, the entireties of all of which are incorporated herein by reference.

TECHNICAL FIELD

The embodiments herein relate to a first communication node and a method performed therein. In particular embodiments herein disclose handling access to a wireless communication network, e.g. procedure for gaining access to a channel.

BACKGROUND

Communication devices within a wireless communications network may be wireless devices such as e.g., User Equipments (UEs), stations (STAs), mobile terminals, wireless terminals, terminals, and/or Mobile Stations (MS). Wireless devices are enabled to communicate wirelessly in a cellular communications network or wireless communication network, sometimes also referred to as a cellular radio system, cellular system, or cellular network. The communication may be performed e.g., between two wireless devices, between a wireless device and a regular telephone, and/or between a wireless device and a server via a Radio Access Network (RAN), and possibly one or more core networks, comprised within the wireless communications network. Wireless devices may further be referred to as mobile telephones, cellular telephones, laptops, or tablets with wireless capability, just to mention some further examples. The wireless devices in the present context may be, for example, portable, pocket-storable, hand-held, computer-comprised, or vehicle-mounted mobile devices, enabled to communicate voice and/or data, via the RAN, with another entity, such as another terminal or a server.

Communication devices may also be network nodes, such as radio network nodes, e.g., Transmission Points (TP). The wireless communications network covers a geographical area which may be divided into cell areas, each cell area being served by a network node such as a Base Station (BS), e.g. a Radio Base Station (RBS), which sometimes may be referred to as e.g., gNB, evolved Node B ("eNB"), "eNodeB", "NodeB", "B node", or BTS (Base Transceiver Station), depending on the technology and terminology used. The base stations may be of different classes such as e.g. Wide Area Base Stations, Medium Range Base Stations, Local Area Base Stations and Home Base Stations, based on transmission power and thereby also cell size. A cell is the geographical area where radio coverage is provided by the base station at a base station site. One base station, situated on the base station site, may serve one or several cells. Further, each base station may support one or several communication technologies. The wireless communications network may also be a non-cellular system, comprising network nodes which may serve receiving nodes, such as wireless devices, with serving beams. In 3rd Generation Partnership Project (3GPP) Long Term Evolution (LTE), base stations, which may be referred to as eNodeBs or even eNBs, may be directly connected to one or more core networks. In the context of this disclosure, the expression Downlink (DL) may be used for the transmission path from the base station to the wireless device. The expression Uplink (UL) may be used for the transmission path in the opposite direction i.e., from the wireless device to the base station.

The so-called 5G system, from a radio perspective started to be standardized in 3GPP, and New Radio (NR) is the name for the radio interface. One of the characteristics is that the frequency range going to higher frequencies than LTE, e.g., above 6 GHz, where it is known to have more challenging propagation conditions such as a higher penetration loss. To mitigate some of these effects, multi-antenna technologies such as beamforming will be massively used. Yet another NR characteristic is the use of multiple numerologies in DL and UL in a cell or for a UE and/or in different frequency bands. Yet another characteristic is the possibility to enable shorter latencies. NR architecture is being discussed in 3GPP. In the current concept, gNB denotes NR base station (BS) (one NR BS may correspond to one or more transmission/reception points).

The 3GPP work on "Licensed-Assisted Access" (LAA) intends to allow LTE equipment to also operate in the unlicensed radio spectrum. Candidate bands for LTE operation in the unlicensed spectrum include 5 GHz, 3.5 GHz, etc. The unlicensed spectrum is used as a complement to the licensed spectrum or allows a completely standalone operation.

For the case of unlicensed spectrum used as a complement to the licensed spectrum, devices connect in the licensed spectrum (primary cell or PCell) and use carrier aggregation to benefit from additional transmission capacity in the unlicensed spectrum (secondary cell or SCell). The carrier aggregation (CA) framework allows to aggregate two or more carriers with the condition that at least one carrier (or frequency channel) is in the licensed spectrum and at least one carrier is in the unlicensed spectrum. In the standalone (or completely unlicensed spectrum) mode of operation, one or more carriers are selected solely in the unlicensed spectrum.

Regulatory requirements, however, may not permit transmissions in the unlicensed spectrum without prior channel sensing, transmission power limitations or imposed maximum channel occupancy time. Since the unlicensed spectrum may need to be shared with other radios of similar or dissimilar wireless technologies, a so called listen-before-talk (LBT) method may need to be applied. LBT involves sensing the medium for a pre-defined minimum amount of time and backing off if the channel is busy. Due to the centralized coordination and dependency of wireless devices on the radio network node, such as eNB, for channel access in LTE operation and imposed LBT regulations, LTE uplink (UL) performance is especially hampered. UL transmission is becoming more and more important with user-centric applications and the need for pushing data to cloud.

Today, the unlicensed 5 GHz spectrum is mainly used by equipment implementing the IEEE 802.11 Wireless Local Area Network (WLAN) standard. This standard is known under its marketing brand "Wi-Fi" and allows completely standalone operation in the unlicensed spectrum. Unlike the case in LTE, Wi-Fi terminals can asynchronously access the medium and thus show better UL performance characteristics especially in congested network conditions.

Long Term Evolution (LTE) uses Orthogonal Frequency Division Multiplexing (OFDM) in the downlink and discrete fourier transform (DFT)-spread OFDM, also referred to as single-carrier Frequency division multiple access (FDMA), in the uplink. The basic LTE downlink physical resource can thus be seen as a time-frequency grid as illustrated in FIG. 1 where each resource element corresponds to one OFDM subcarrier during one OFDM symbol interval. The uplink subframe has the same subcarrier spacing as the downlink and the same number of SC-FDMA symbols in the time domain as OFDM symbols in the downlink.

In the time domain, LTE downlink transmissions are organized into radio frames of 10 ms, each radio frame consisting of ten equally-sized subframes of length Tsubframe=1 ms as shown in FIG. 2. Each subframe comprises two slots of duration 0.5 ms each, and the slot numbering within a frame ranges from 0 to 19. For normal cyclic prefix, one subframe consists of 14 OFDM symbols. The duration of each symbol is approximately 71.4 µs.

Furthermore, the resource allocation in LTE is typically described in terms of resource blocks, where a resource block corresponds to one slot (0.5 ms) in the time domain and 12 contiguous subcarriers in the frequency domain. A pair of two adjacent resource blocks in time direction (1.0 ms) is known as a resource block pair. Resource blocks are numbered in the frequency domain, starting with 0 from one end of the system bandwidth.

Downlink transmissions are dynamically scheduled, i.e., in each subframe the radio network node transmits control information about which wireless devices data is transmitted to and upon which resource blocks the data is transmitted, in the current downlink subframe. This control signalling is typically transmitted in the first 1, 2, 3 or 4 OFDM symbols in each subframe and the number n=1, 2, 3 or 4 is known as the Control Format Indicator (CFI). The downlink subframe also contains common reference symbols, which are known to the receiver and used for coherent demodulation of e.g. the control information. A downlink system with CFI=3 OFDM symbols as control is illustrated in FIG. 3. The reference symbols shown in FIG. 3 are the cell specific reference symbols (CRS) and are used to support multiple functions including fine time and frequency synchronization and channel estimation for certain transmission modes.

Uplink transmissions are dynamically scheduled, i.e., in each downlink subframe the radio network node transmits control information about which wireless devices should transmit data to the radio network node in subsequent subframes, and upon which resource blocks the data is transmitted. The uplink resource grid is comprised of data and uplink control information in the Physical Uplink Shared Channel (PUSCH), uplink control information in the Physical Uplink Control Channel (PUCCH), and various reference signals such as demodulation reference signals (DMRS) and sounding reference signals (SRS). DMRS are used for coherent demodulation of PUSCH and PUCCH data, whereas SRS is not associated with any data or control information but is generally used to estimate the uplink channel quality for purposes of frequency-selective scheduling. An example uplink subframe is shown in FIG. 4. Note that UL DMRS and SRS are time-multiplexed into the UL subframe, and SRS are always transmitted in the last symbol of a normal UL subframe. The PUSCH DMRS is transmitted once every slot for subframes with normal cyclic prefix, and is located in the fourth and eleventh SC-FDMA symbols.

From LTE Rel-11 onwards, DL or UL resource assignments can also be scheduled on the enhanced Physical Downlink Control Channel (EPDCCH). For Rel-8 to Rel-10 only the Physical Downlink Control Channel (PDCCH) is available. Resource grants are wireless device specific and are indicated by scrambling the downlink control information (DCI) Cyclic Redundancy Check (CRC) with the UE-specific cell specific Radio Network Temporary Identifier (C-RNTI) identifier. A unique C-RNTI is assigned by a cell to every wireless device associated with it, and can take values in the range 0001-FFF3 in hexadecimal format. A wireless device uses the same C-RNTI on all serving cells.

Scheduled LTE Uplink Scheme. In LTE the uplink access is typically controlled by a radio network node, i.e., scheduled. In this case the wireless device would report to the radio network node when data is available to be transmitted, e.g., by sending a scheduling request (SR) message. Based on this, the radio network node may grant the resources and relevant information to the wireless device in order to carry out the transmission of a certain size of data. The assigned resources are not necessarily sufficient for the wireless device to transmit all the available data. Therefore, it is possible that the wireless device sends a buffer status report (BSR) control message in the granted resources, in order to inform the radio network node about the correct size and updated size of the data waiting for transmission. Based on that, the radio network node may further grant the resources to carry on with the wireless device uplink transmission of the corrected size of data.

In more detail, every time new data arrives at the wireless device's empty buffer, the following procedure may need to be performed:

1. Using Physical Uplink Control Channel (PUCCH), the wireless device informs the network that it needs to transmit data by sending a Scheduling Request (SR) indicating that it needs uplink access. The wireless device has a periodic timeslots for SR transmissions (typically on a 5, 10, or 20 ms interval).

2. Once the eNB receives the SR request bit, it responds with a small "uplink grant" that is just large enough to communicate the size of the pending buffer. The reaction to this request typically takes 3 ms.

3. After the wireless device receives and processes (takes about 3 ms) its first uplink grant, it typically sends a Buffer Status Report (BSR), that is, a MAC Control Element (MAC CE) used to provide information about the amount of pending data in the uplink buffer of the wireless device. If the grant is big enough, the wireless device sends data from its buffer within this transmission as well. Whether the BSR is sent depends also on conditions specified in e.g. 3GPP TS 36.321.

4. The radio network node receives the BSR message, allocates the necessary uplink resources and sends back another uplink grant that will allow the wireless device to drain its buffer.

Adding it all up, about 16 ms (+time to wait for PUCCH transmission opportunity) of delay can be expected between data arrival at the empty buffer in the wireless device and reception of this data in the radio network node.

In case the wireless device is not radio resource control (RRC) connected in LTE or lost its uplink synchronization since it did not transmit or receive anything for a certain time, the wireless device would use the random access procedure to connect to the network, obtain synchronization and also send the SR. If this is the case the procedure until the data can be sent would take even longer than the SR transmission on PUCCH.

Downlink Control Information (DCI) for Scheduling LTE Uplink Transmission

In the LTE system, the transmission formats and parameters are controlled by the radio network node. Such downlink control information (DCI) typically contains Resources allocated for UL transmission (including whether frequency hopping is applied).
    Modulation and coding scheme (MCS)
    Redundancy versions (RV)
    New data indicator (NDI)
    Transmit power control command
    Information about demodulation reference symbol (DMRS)
    In case of cross-carrier scheduling, the target carrier index is also included.
    Other applicable control information on UL transmissions The DCI is first protected by a 16-bit CRC. The CRC bits are further scrambled by the wireless device assigned identity such as C-RNTI. The DCI and scrambled CRC bits are further protected by convolutional coding. The encoded bits are transmitted from the radio network node to the wireless device using either PDCCH or EPDCCH.

Hybrid automatic repeat request (HARQ) design: For frequency division duplex (FDD): Asynchronous HARQ is used for Downlink. This means that the 8 HARQ processes may be used in any order. Nevertheless, the radio network node sends, e.g. Process ID, and redundancy value (RV), in PDCCH so the wireless device 10 may know which HARQ process it received during a certain subframe.

For uplink Synchronous HARQ is used. The wireless device has to use the same HARQ process number every 8 subframes. Since a specific HARQ process ID is used at specific subframe, the receiver (eNode B) knows exactly which HARQ process comes when. And the radio network node may also know about RV because UL Grant (DCI 0) from the radio network node may specify RV using MCS field. HARQ has two modes of operation: Adaptive and Non-Adaptive HARQ. With Adaptive, the wireless device does not care about "HARQ feedback Physical Hybrid-ARQ Indicator Channel (PHICH)", it retransmit based on DCI 0 information. While non-adaptive retransmission follows a HARQ feedback, e.g. PHICH=NACK, without a DCI 0 and the wireless device retransmits using the same downlink control information (RB, MCS, etc) as the initial transmission.

For time division duplex, TDD: One UL subframe acknowledgments of multiple DL transport blocks is supported since some TDD configuration contain unequal number of DL/UL subframes. The PUCCH design for TDD is different than FDD, since for TDD it may be required to carry multiple acknowledgements (ACK) per UE. An alternative mechanism that allows for reuse of the FDD PUCCH design is also provided in LTE TDD, where by the acknowledgment corresponding to multiple DL transmissions are group using a logical "AND" operation to form a single acknowledgment whether zero or more than zero blocks were received in error. However, this may require retransmission of all the HARQ processes if at least one of them is non-acknowledged (NACK).

In typical deployments of Wireless Local Area Network (WLAN), carrier sense multiple access with collision avoidance (CSMA/CA) is used for medium access. This means that the channel is sensed to perform a clear channel assessment (CCA), and a transmission is initiated only if the channel is declared as Idle. In case the channel is declared as Busy, the transmission is essentially deferred until the channel is deemed to be Idle.

A general illustration of the listen before talk (LBT) mechanism of Wi-Fi is shown in FIG. 5. After a Wi-Fi station A transmits a data frame to a station B, station B shall transmit the ACK frame back to station A with a delay of 16 μs. Such an ACK frame is transmitted by station B without performing a LBT operation. To prevent another station interfering with such an ACK frame transmission, a station shall defer for a duration of 34 μs, referred to as distributed coordination function inter-frame space (DIFS), after the channel is observed to be occupied before assessing again whether the channel is occupied. Therefore, a station that wishes to transmit first performs a CCA by sensing the medium for a fixed duration DIFS. If the medium is idle then the station assumes that it may take ownership of the medium and begin a frame exchange sequence. If the medium is busy, the station waits for the medium to go idle, defers for DIFS, and waits for a further random backoff period.

In the above basic protocol, when the medium becomes available, multiple Wi-Fi stations may be ready to transmit, which can result in collision. To reduce collisions, stations intending to transmit select a random backoff counter and defer for that number of slot channel idle times. The random backoff counter is selected as a random integer drawn from a uniform distribution over the interval of zero to contention window i.e. [0, CW]. The default size of the random backoff contention window, CWmin, is set in the IEEE specs. Note that collisions can still happen even under this random backoff protocol when there are many stations contending for the channel access. Hence, to avoid recurring collisions, the backoff contention window size CW is doubled whenever the station detects a collision of its transmission up to a limit, CWmax, also set in the IEEE specs. When a station succeeds in a transmission without collision, it resets its random backoff contention window size back to the default value CWmin.

Load-based clear channel assessment in Europe regulation EN 301.893. For a device not utilizing the Wi-Fi protocol, EN 301.893, v. 1.7.1 provides the following requirements and minimum behaviour for the load-based clear channel assessment.

1) Before a transmission or a burst of transmissions on an Operating Channel, the equipment shall perform a Clear Channel Assessment (CCA) check using "energy detect" i.e. detecting energy above a threshold. The equipment shall observe the Operating Channel(s) for the duration of the CCA observation time which shall be not less than 20 μs. The CCA observation time used by the equipment shall be declared by the manufacturer. The Operating Channel shall be considered occupied if the energy level in the channel exceeds the threshold corresponding to the power level given in point 5 below. If the equipment finds the channel to be clear, it may transmit immediately (see point 3 below).

2) If the equipment finds an Operating Channel occupied, it shall not transmit in that channel. The equipment shall perform an Extended CCA check in which the Operating Channel is observed for the duration of a random factor N multiplied by the CCA observation time. N defines the number of clear idle slots resulting in a total Idle Period that need to be observed before initiation of the transmission. The value of N shall be randomly selected in the range 1 . . . q every time an Extended CCA is required and the value stored in a counter. The value of q is selected by the manufacturer in the range 4 . . . 32. This selected value shall be declared by the manufacturer (see clause 5.3.1 q)). The counter is decremented every time a CCA slot is considered to be "unoccupied". When the counter reaches zero, the equipment may transmit.

3) The total time that an equipment makes use of an Operating Channel is the Maximum Channel Occupancy Time which shall be less than $(13/32) \times q$ ms, with q as defined in point 2 above, after which the device shall perform the Extended CCA described in point 2 above.

4) The equipment, upon correct reception of a packet which was intended for this equipment, can skip CCA and immediately (see note 4) proceed with the transmission of management and control frames (e.g. ACK and Block ACK frames). A consecutive sequence of transmissions by the equipment, without it performing a new CCA, shall not exceed the Maximum Channel Occupancy Time as defined in point 3 above.

NOTE 4: For the purpose of multi-cast, the ACK transmissions (associated with the same data packet) of the individual devices are allowed to take place in a sequence.

5) The energy detection threshold for the CCA shall be proportional to the maximum transmit power (PH) of the transmitter: for a 23 dBm e.i.r.p. transmitter the CCA threshold level (TL) shall be equal or lower than −73 dBm/MHz at the input to the receiver (assuming a 0 dBi receive antenna). For other transmit power levels, the CCA threshold level TL shall be calculated using the formula: TL=−73 dBm/MHz+23−PH (assuming a 0 dBi receive antenna and PH specified in dBm e.i.r.p.).

An example to illustrate the EN 301.893 LBT is provided in FIG. 6.

Licensed-assisted access (LAA) to unlicensed spectrum using LTE. Up to now, the spectrum used by LTE is dedicated to LTE. This has the advantage that LTE system does not need to care about the coexistence issue and the spectrum efficiency can be maximized. However, the spectrum allocated to LTE is limited which cannot meet the ever increasing demand for larger throughput from applications/services. Therefore, Rel-13 LAA extended LTE to exploit unlicensed spectrum in addition to licensed spectrum. Unlicensed spectrum can, by definition, be simultaneously used by multiple different technologies. Therefore, LTE may need to consider the coexistence issue with other systems such as IEEE 802.11 (Wi-Fi). Operating LTE in the same manner in unlicensed spectrum as in licensed spectrum can seriously degrade the performance of Wi-Fi as Wi-Fi will not transmit once it detects the channel is occupied.

Furthermore, one way to utilize the unlicensed spectrum reliably is to transmit essential control signals and channels on a licensed carrier. That is, as shown in FIG. 7, a wireless device is connected to a PCell in the licensed band and one or more SCells in the unlicensed band. In this application we denote a secondary cell in unlicensed spectrum as licensed-assisted access secondary cell (LAA SCell). In the case of standalone operation as in MulteFire, no licensed cell is available for uplink control signal transmissions.

Unscheduled Uplink for LAA/multeFire

To improve the UL performance, the main target may be to lower the UL latency by reducing the control signalling related to scheduling that precede every UL transmission. In addition, UL transmissions may need to not be subject to repeated subsequent LBTs when operating in unlicensed spectrum.

To reduce the control signalling overhead, LTE provides the option to do semi-persistent scheduling (SPS) which is the basis of autonomous UL operation. The wireless device is configured to transmit on pre-allocated resources. When UL data arrives, the wireless device can start transmission immediately according to the configured resources without the need to send an SR or waiting for the grant as shown in FIG. 8. Autonomous UL feature is based on semi-persistent scheduling.

HARQ Design

Autonomous uplink (AUL) on LAA SCells following SPS-like behaviour (RRC configuration and DCI activation). One foremost issue when AUL based on SPS-like feature is supported is the UL HARQ design. In SPS, when the feature is activated, the radio network node proactively sends NACK on PHICH for the SPS resource until UL data has been decoded. The SPS HARQ design is based on synchronous UL HARQ. The data reception and the feedback transmission have a fixed time relation of 4 subframes. This design might work if the feedback is sent on the primary licensed carrier that is always available. Nevertheless, with the intention of overbooking the resources on the LAA unlicensed carrier, it is not clear how PHICH collisions can be avoided. On the other hand, the same design is not applicable for unlicensed carrier, first, PHICH is not available on LAA secondary cells, second, it highly utilizes the unlicensed channel, and third, this kind of synchronous behaviour with fixed timing between data transmission and feedback reception cannot be deployed on unlicensed channel due to uncertainty of channel availability.

In eLAA, any uplink transmission (new transmission or retransmission) is scheduled via UL grant through (e)PDCCH. This works well for scheduled access where the radio network node is aware of wireless device buffer and every failed UL attempt. With autonomous UL, the radio network node does not know when to expect an UL transmission. There is a chance that the UL transmission is missed by the radio network node. In this case, the radio network node will not request a retransmission. Scheduled transmission via UL grant through (e)PDCCH is not sufficient in case of AUL transmissions.

Asynchronous UL HARQ operation was considered beneficial for eLAA in particular when retransmissions are blocked and postponed due to LBT. The following situations might happen in case of AUL:

The radio network node may fail to transmit the feedback at n+4 due to failed LBT. Therefore, the timing relation between AUL transmission and corresponding UL HARQ feedback should not be fixed. Potentially, the HARQ feedback may include pending feedback for several uplink transmissions from the same wireless device.

Similarly, timing relationship between UL HARQ feedback and corresponding retransmission should not be fixed. Unlike scheduled UL, the HARQ process information in case of AUL are not indicated to the wireless device as in the scheduled UL.

Therefore, Asynchronous AUL HARQ feedback and retransmissions are supported for AUL transmissions, meaning that:

(1) Timing relationship between AUL transmission and corresponding UL HARQ feedback is not fixed.

(2) Timing relationship between UL HARQ feedback and corresponding retransmission is not fixed.

CW Adjustment

Wireless device contention window (CW) update procedure is the same as defined for Uplink Type 1 Channel access for eLAA [36.213, Section 15.2.2], except for possible availability of explicit HARQ feedback. Additionally, a common wireless device CW is maintained for scheduled UL and AUL.

The reference subframe is defined as the first subframe of the most recent UL (scheduled based uplink (SUL) or AUL) burst of contiguous subframes that is transmitted after performing a category 4 LBT procedure at least 4 subframes prior to a UL grant reception or an AUL Downlink feedback information. The HARQ ID of the reference subframe is HARQ_ID_ref.

Regarding the CW size (CWS) adaptation, i.e., increase/reset, if the wireless device receives an UL grant or an AUL-downlink feedback indication (DFI), the contention window size for all the priority classes is adjusted as following:

The CWS at the wireless device is reset to minimum size for all the priority classes if:
An UL grant is received and the new data indicator (NDI) bit for at least one of the active HARQ processes (i.e. transport block (TB) not disabled) associated with HARQ_ID_ref is toggled; OR
An AUL-DFI is received and indicates ACK for at least one of the active HARQ processes (i.e. TB not disabled) associated with HARQ_ID_ref
The CWS of all priority classes at the wireless device is increased to the next higher value if:
An UL grant is received and the NDI bit(s) of all the active HARQ processe(s) for the reference subframe are not toggled; OR
An UL grant is received and does not schedule any active HARQ process (i.e. TB not disabled) for the reference subframe; OR
An AUL-DFI is received which does not indicate ACK for at least one of the active HARQ processes for the reference subframe.
The CWS is reset to the minimum value if the maximum CWS is used for K consecutive LBT attempts for transmission only for the priority class for which maximum CWS is used for K consecutive LBT attempts.
K is selected by wireless device implementation from the set of values from (1, . . . , 8).
The NDI value(s) received in the UL grant or the HARQ-ACK value(s) received in the earliest AUL-DFI after n_ref+3 is used for adjusting the CWS, where n_ref is the reference subframe.
HARQ_ID_ref is the HARQ ID of n_ref.

Existing methods for performing unscheduled uplink transmissions may result in wasted resources, and/or increased latency.

SUMMARY

It is an object of embodiments herein to enable communication, such as enable unscheduled uplink transmissions, in a wireless communications network in an efficient manner.

Several embodiments are comprised herein. It should be noted that the examples herein are not mutually exclusive. Components from one embodiment may be tacitly assumed to be present in another embodiment and it will be obvious to a person skilled in the art how those components may be used in the other exemplary embodiments.

A first aspect relates to a method, performed by a first communication node is described herein. The method may be understood to be for initiating a sensing procedure. The first communication node operates in the wireless communications network. The first communication node, such as a UE, adjusts a value of a Contention Window (CW) based on one or more criteria. The first communication node adjusts the value of the CW, from a first value to a second value. The second value is a higher value, e.g., a first higher value, than the first value. The adjusting 1001 is performed before a sensing procedure performed prior to a transmission of an Uplink (UL) burst to a second communication node. The adjusting is based on one or more feedback timers having expired at a time of performing the sensing procedure in the absence of: a) a received UL grant from the second communication node, or b) a downlink feedback from the second communication node for an Autonomous Uplink (AUL) transmission from the first communication node. The first communication node further, following the adjusting of the value, initiates the sensing procedure performed prior to the transmission of the UL burst to the second communication node, wherein the sensing procedure uses the adjusted second value of the CW.

According to another aspect the object is achieved by providing a first communication node configured to operate in a wireless communications network. The first communication node is configured to adjust a value of a CW from a first value to a second value, the second value being a higher value than the first value. The adjustment of the value is based on one or more feedback timers having expired at a time of performing a sensing procedure in the absence of: a) a received uplink, UL, grant from a second communication node, or b) a downlink feedback from the second communication node for an AUL transmission from the first communication node. The first communication node is further configured to, following adjusting the value, initiate the sensing procedure performed prior to a transmission of an UL burst to the second communication node, wherein the sensing procedure uses the adjusted value of the CW.

It is furthermore provided herein a computer program product comprising instructions, which, when executed on at least one processor, cause the at least one processor to carry out any of the methods above, as performed by the first communication node. It is additionally provided herein a computer-readable storage medium, having stored thereon a computer program product comprising instructions which, when executed on at least one processor, cause the at least one processor to carry out the method according to any of the methods above, as performed by the first communication node.

By having the first communication node adjusting the value of the CW based on e.g. a first number of feedback timers having expired at the time of performing the sensing procedure in the absence of the received UL grant or the downlink feedback for the AUL transmission, the first communication node is enabled to initiate the sensing procedure with a more efficient and optimized value of the CW, for example, avoiding unnecessarily increasing the CW, and therefore saving resources and e.g. reducing latency of transmissions. Using one or more feedback timers having expired may allow to make certain assumptions on the likelihood that the second communication node may have received the respective UL bursts previously transmitted by the first communication node to the second communication node, e.g., due to radio conditions. Embodiments herein thus provide ways of enabling communication in an efficient e.g. resource efficient, manner.

BRIEF DESCRIPTION OF THE DRAWINGS

Examples of embodiments herein are described in more detail with reference to the accompanying drawings, and according to the following description.

FIG. 17 is a flowchart depicting embodiments of a method in a communications system including a host computer, a base station and a user equipment, according to embodiments herein.

FIG. 18 is a flowchart depicting embodiments of a method in a communications system including a host computer, a base station and a user equipment, according to embodiments herein.

FIG. 19 is a flowchart depicting embodiments of a method in a communications system including a host computer, a base station and a user equipment, according to embodiments herein.

FIG. 20 is a flowchart depicting embodiments of a method in a communications system including a host computer, a base station and a user equipment, according to embodiments herein.

DETAILED DESCRIPTION

As part of the development of embodiments herein, one or more problems with the existing technology will first be identified and discussed.

For scheduled UL access, the wireless device is fully controlled by the radio network node, in terms of the time the radio network node schedules the wireless device and the time when the radio network node decides to send feedback for previous UL transmissions. Therefore, the case in which the wireless device initiates Category 4 LBT UL (SUL/AUL) transmission on its own without indication from the radio network node did not exist before.

However, with AUL, the wireless device is in control of when to initiate a CAT4 LBT and which HARQ process to transmit. Therefore, the rules for contention window adjustments may need to be extended to include the case in which the wireless device initiates Category 4 LBT UL transmission before reception of feedback for previous Category 4 LBT UL transmission.

Certain aspects of the present disclosure and their embodiments may provide solutions to this challenge or other challenges. There are, proposed herein, various embodiments which address one or more of the issues disclosed herein.

Embodiments herein may be understood to address this problem in existing methods by providing a method of contention window adjustment for AUL in case of no feedback reception.

Embodiments herein may be understood to be related to methods for contention window adjustment for the case no feedback reception.

Particular embodiments herein may apply, e.g., to LAA, MulteFire, and NR-U when autonomous UL mode is activated.

Some of the embodiments contemplated will now be described more fully hereinafter with reference to the accompanying drawings, in which examples are shown. In this section, the embodiments herein will be illustrated in more detail by a number of exemplary embodiments. Other embodiments, however, are contained within the scope of the subject matter claimed herein. The disclosed subject matter should not be construed as limited to only the embodiments set forth herein; rather, these embodiments are provided by way of example to convey the scope of the subject matter to those skilled in the art. It should be noted that the exemplary embodiments herein are not mutually exclusive. Components from one embodiment may be tacitly assumed to be present in another embodiment and it will be obvious to a person skilled in the art how those components may be used in the other exemplary embodiments.

Note that although terminology from LTE/5G has been used in this disclosure to exemplify the embodiments herein, this should not be seen as limiting the scope of the embodiments herein to only the aforementioned system. Other wireless systems with similar features, may also benefit from exploiting the ideas covered within this disclosure.

Figure 1:
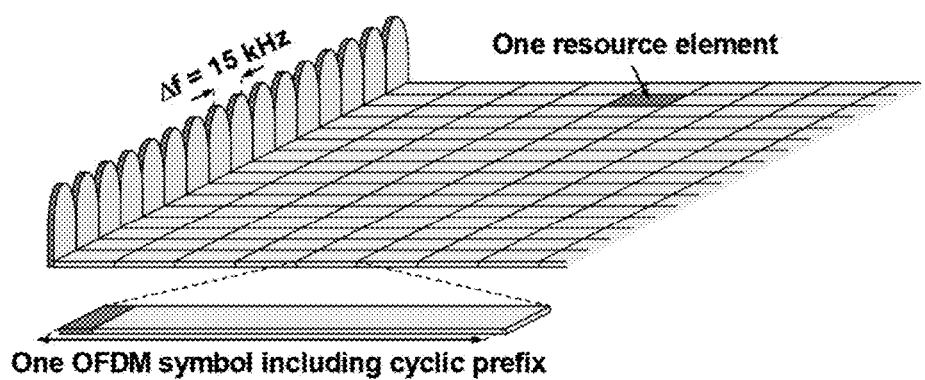
FIG. 1 is a schematic diagram depicting the LTE downlink physical resource.
Figure 2:
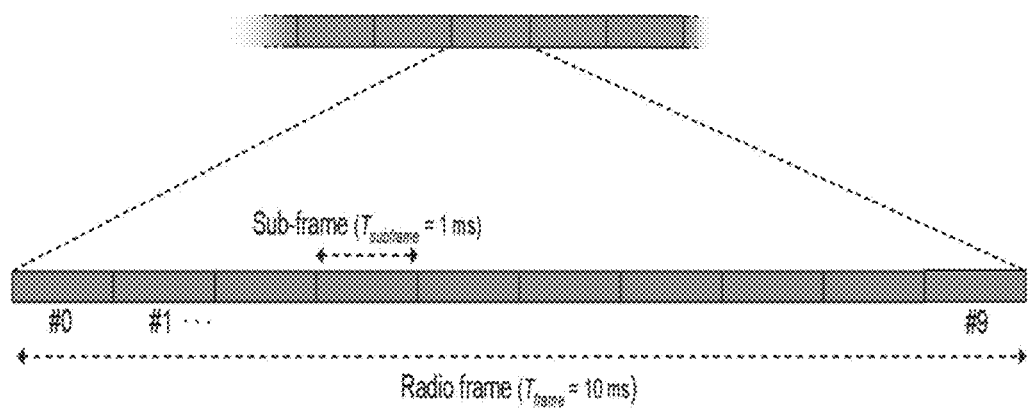
FIG. 2 is a schematic diagram depicting the LTE time-domain structure.
Figure 3:
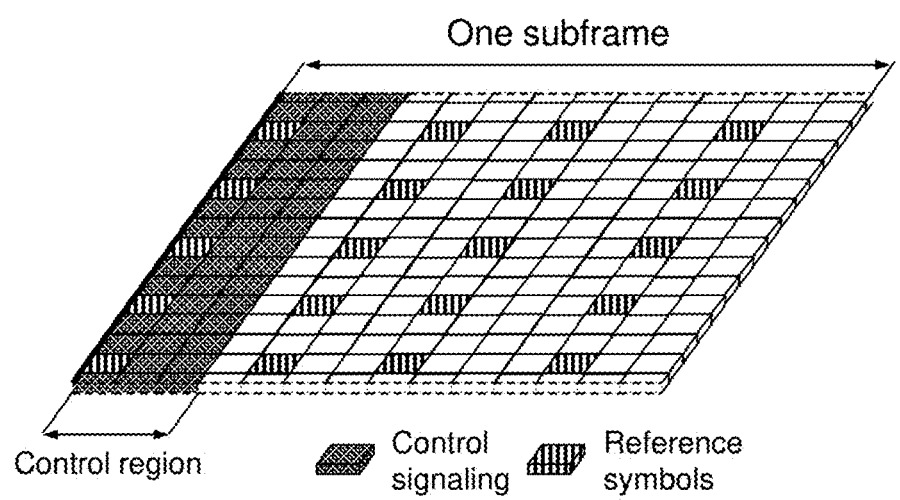
FIG. 3 is a schematic diagram depicting a Downlink subframe.
Figure 4:
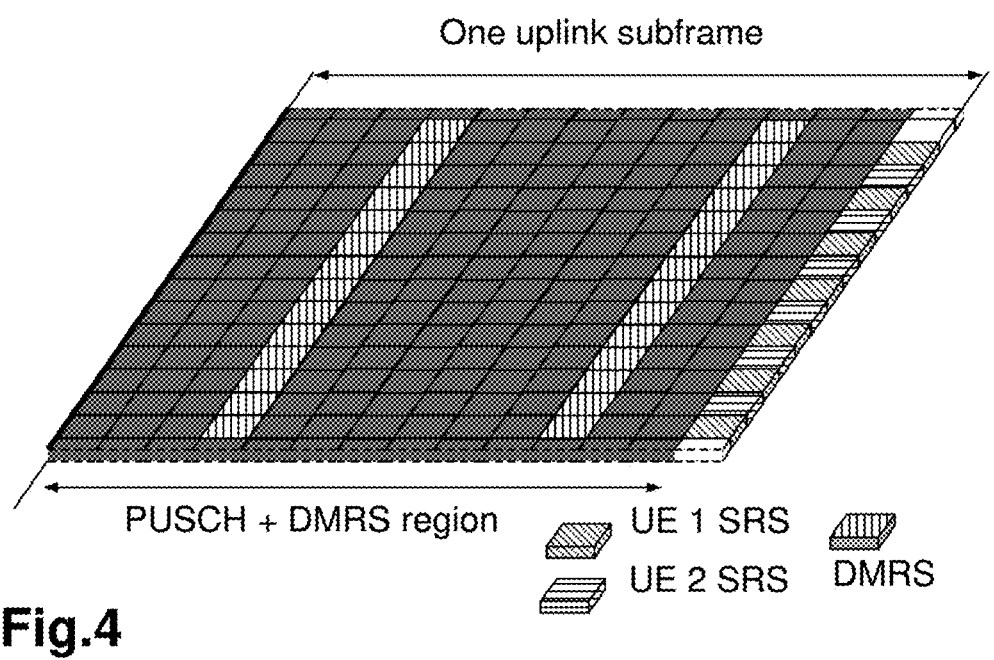
FIG. 4 is a schematic diagram depicting an Uplink subframe.
Figure 5:
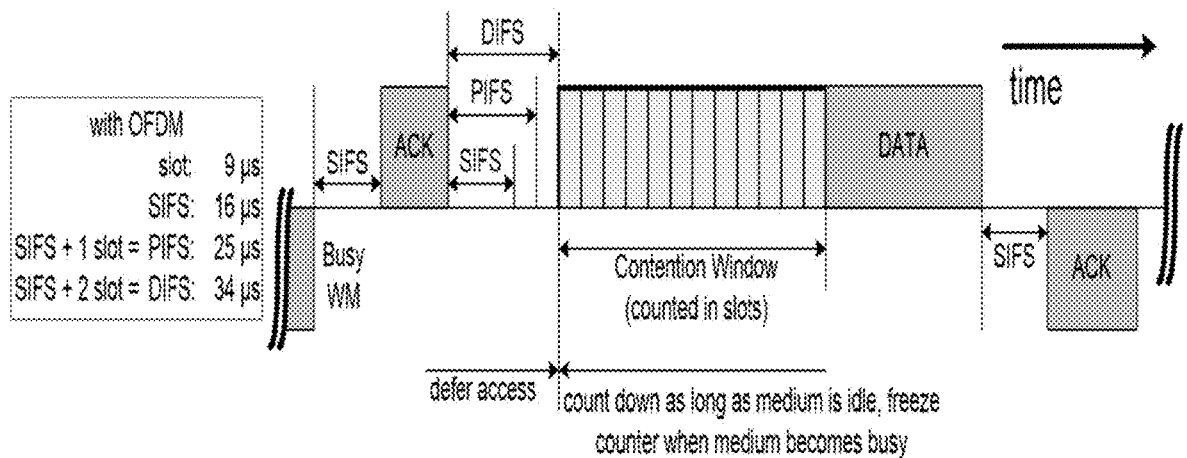
FIG. 5 is a schematic diagram depicting an illustration of listen before talk (LBT) in Wi-Fi.
Figure 6:
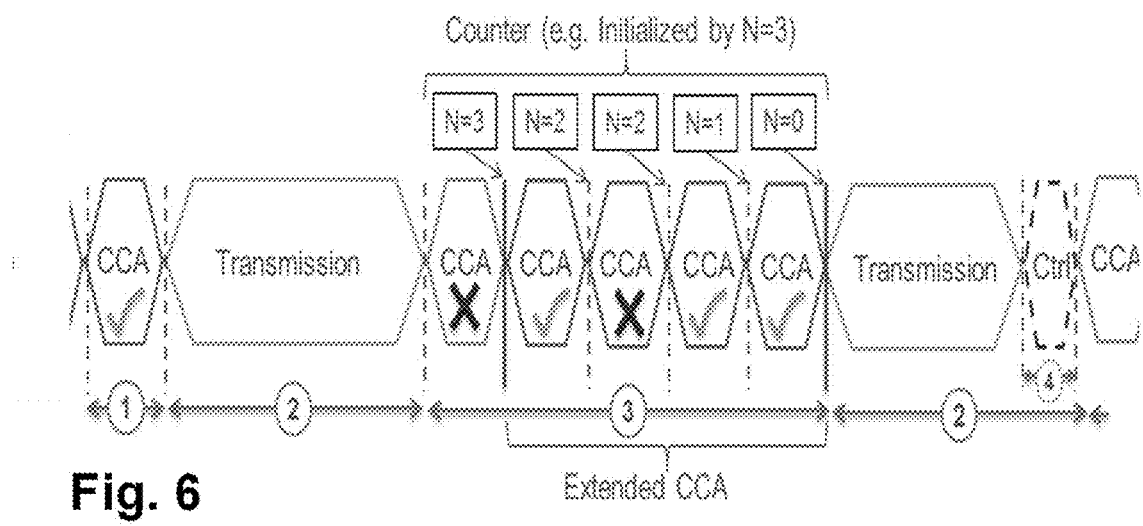
FIG. 6 is a schematic diagram depicting an illustration of listen before talk (LBT) in EN 301.893.
Figure 7:
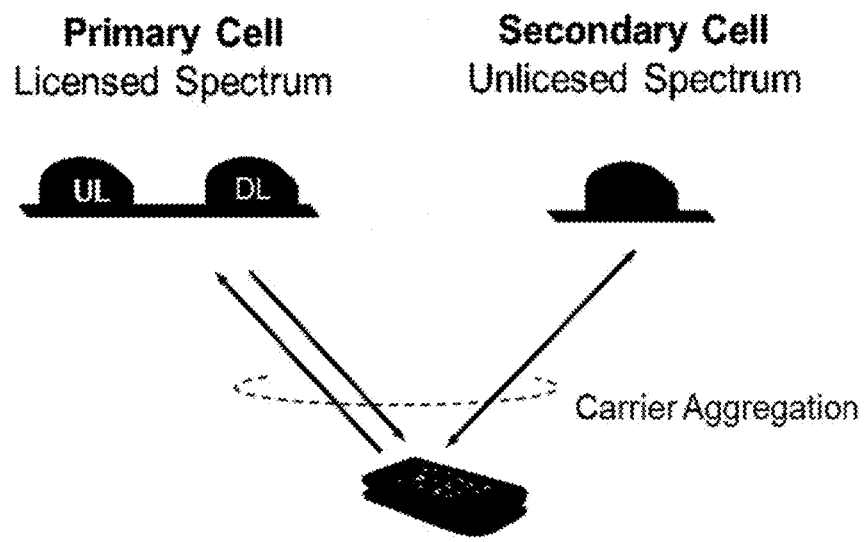
FIG. 7 is a schematic diagram depicting a Licensed-assisted access (LAA) to unlicensed spectrum using LTE carrier aggregation.
Figure 8:
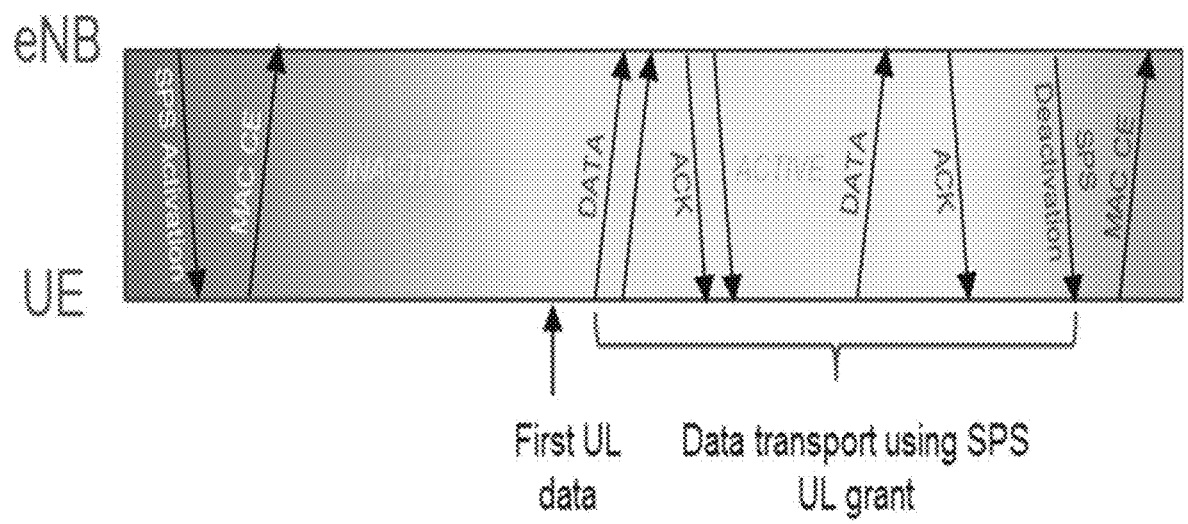
FIG. 8 is a schematic diagram depicting an LTE UL SPS operation.
Figure 9:
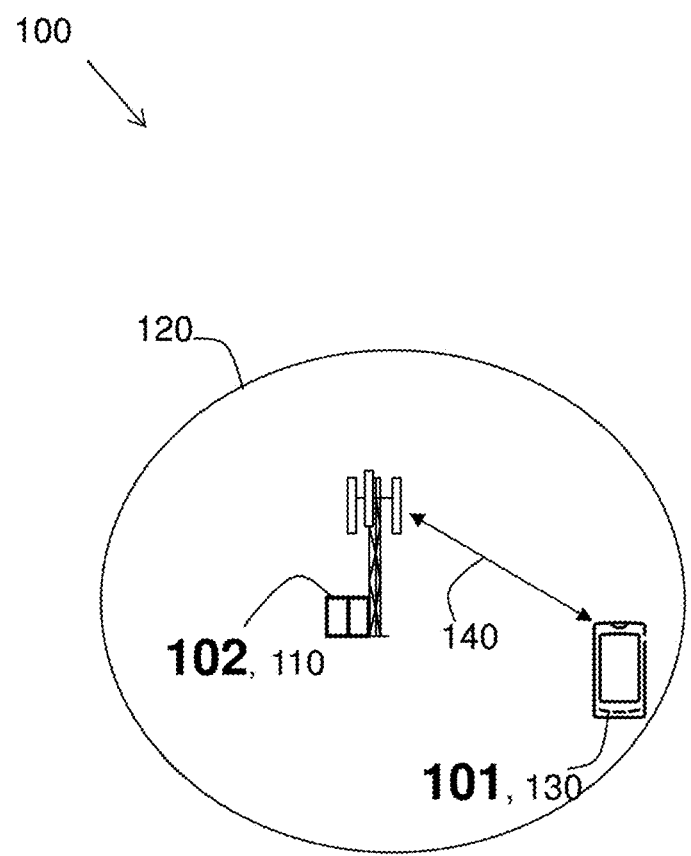
FIG. 9 is a schematic diagram illustrating a wireless communications network, according to embodiments herein.

FIG. 9 depicts a non-limiting example of a wireless communications network 100, sometimes also referred to as a wireless communications system, cellular radio system, or cellular network, in which embodiments herein may be implemented. The wireless communications network 100 may enable transmissions in an autonomous UL mode. The wireless communications network 100 may typically be a 5G system, 5G network, NR-U or Next Gen System or network, LAA, MulteFire. The wireless communications network 100 may alternatively be a younger system than a 5G system The wireless communications network 100 may support other technologies such as, for example, Long-Term Evolution (LTE), LTE-Advanced/LTE-Advanced Pro, e.g. LTE Frequency Division Duplex (FDD), LTE Time Division Duplex (TDD), LTE Half-Duplex Frequency Division Duplex (HD-FDD), LTE operating in an unlicensed band, NB-IoT. Thus, although terminology from 5G/NR and LTE may be used in this disclosure to exemplify embodiments herein, this should not be seen as limiting the scope of the embodiments herein to only the aforementioned systems.

The wireless communications network 100 comprises a plurality of communication nodes, whereof a first communication node 101 and a second communication node 102 are depicted in the non-limiting example of FIG. 9. The first communication node 101 may be considered as a node supporting transmission in the autonomous UL mode. As depicted in the non-limiting example of FIG. 9, the first communication node 101 may typically be a wireless device as a wireless device 130 as described below. As also depicted in the non-limiting example of FIG. 9, the second communication node 102 may typically be a radio network node as a network node 110 as described below, or another wireless device in a Device-to-Device communication with the first communication node 101.

The wireless communications network 100 comprises a plurality of network nodes, whereof a network node 110 is depicted in the non-limiting example of FIG. 9. The network node 110 may be a radio network node, such as a radio base station, or any other network node with similar features capable of serving a wireless device, such as a user equipment or a machine type communication device, in the wireless communications network 100. In typical embodiments, the network node 110 may be a transmission point operating on NR, for example a New Radio (NR) NodeB (gNB). In some examples, the network node 110 may be radio base station operating on LTE, such as an eNB.

The wireless communications network 100 covers a geographical area which may be divided into cell areas, wherein each cell area may be served by a network node, although, one network node may serve one or several cells. The wireless communications network 100 comprises at least a cell 120. In the non-limiting example depicted in FIG. 9, the network node 110 serves the cell 120. The network node 110 may be of different classes, such as, e.g., macro base station (BS), home BS or pico BS, based on transmission power and thereby also cell size. The network node 110 may be directly connected to one or more core networks, which are not depicted in FIG. 9 to simplify the Figure. In some examples, the network node 110 may be a distributed node, such as a virtual node in the cloud, and it may perform its functions entirely on the cloud, or partially, in collaboration with a radio network node.

A plurality of wireless devices are located in the wireless communication network 100, whereof a wireless device 130, which may also be referred to as a device, is depicted in the non-limiting example of FIG. 9. The wireless device 130, e.g., a 5G UE, may be a wireless communication device which may also be known as e.g., a UE, a mobile terminal, wireless terminal and/or mobile station, a mobile telephone, cellular telephone, or laptop with wireless capability, just to mention some further examples. The wireless device 130 may be, for example, portable, pocket-storable, hand-held, computer-comprised, or a vehicle-mounted mobile device, enabled to communicate voice and/or data, via the RAN, with another entity, such as a server, a laptop, a Personal Digital Assistant (PDA), or a tablet, Machine-to-Machine (M2M) device, device equipped with a wireless interface, such as a printer or a file storage device, modem, or any other radio network unit capable of communicating over a radio link in a communications system. The wireless device 130 comprised in the wireless communications network 100 is enabled to communicate wirelessly in the wireless communications network 100. The communication may be performed e.g., via a RAN, and possibly the one or more core networks, which may be comprised within the wireless communications network 100.

The first communication node 101 may be configured to communicate in the wireless communications network 100 with the second communication node 102 over a link 140, e.g., a radio link, although communication over more links may be possible.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

In general, the usage of "first", "second", "third", "fourth" and/or "fifth" herein may be understood to be an arbitrary way to denote different elements or entities, and may be understood to not confer a cumulative or chronological character to the nouns they modify, unless otherwise noted, based on context.

Several embodiments are comprised herein. It should be noted that the examples herein are not mutually exclusive. Components from one embodiment may be tacitly assumed to be present in another embodiment and it will be obvious to a person skilled in the art how those components may be used in the other exemplary embodiments.

More specifically, the following are embodiments related to a wireless device, such as the wireless device 130, e.g., a 5G UE.

The first communication node 101 embodiments relate to FIG. 10, FIG. 14, and FIGS. 15-20.

A method, performed by the first communication node 101 is described herein. The method may be understood to be for initiating a sensing procedure. The first communication node 101 operates in the wireless communications network 100. The method may comprise the following actions.

Figure 10:
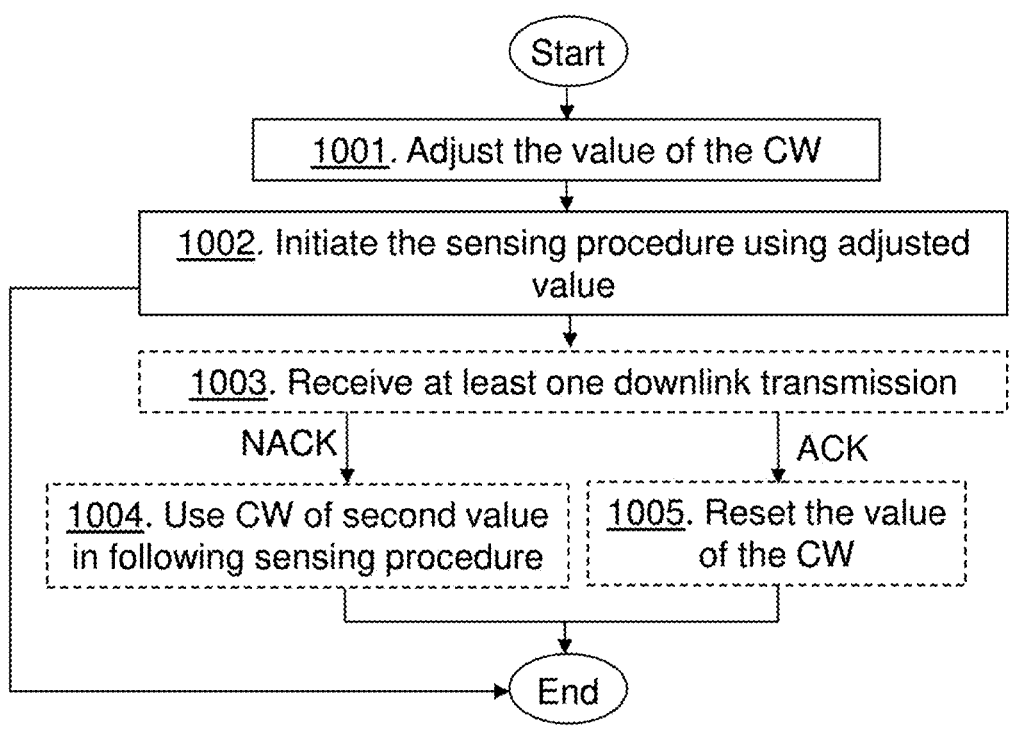
FIG. 10 is a flowchart depicting a method in a first communication node, according to embodiments herein.

In some embodiments all the actions may be performed. In some embodiments, one or more actions may be performed. One or more embodiments may be combined, where applicable. All possible combinations are not described to simplify the description. In FIG. 10, optional actions are indicated with dashed lines. Some actions may be performed in a different order than that shown in FIG. 10.

Action 1001. The first communication node 101 adjusts a value of a Contention Window (CW) based on one or more criteria. The first communication node such as the wireless device 130 adjusts the value of the CW from a first value to a second value. The second value is a higher value, e.g., a first higher value, than the first value. The adjusting 1001 may be performed before a sensing procedure to be performed prior to a transmission of an Uplink (UL), burst to the second communication node 102. The first communication node 101 adjusts the value based on one or more feedback timers having expired at a time of performing a sensing procedure in the absence of: a) a received UL grant from the second communication node 102, or b) a downlink feedback from the second communication node 102 for an AUL transmission from the first communication node. The value of the CW may be adjusted for all priority classes at the first communication node 101. At the time of performing the sensing procedure, the one or more feedback timers may have expired in the absence of any downlink transmission from the second communication node 102, the higher value may be increased once to a next higher value. The next higher value may be dependent on number of expired feedback timers. Alternatively or additionally, at the time of performing the sensing procedure, the one or more feedback timers have expired, and at least one DL transmission has been received from the second communication node 102, wherein the DL transmission being devoid of feedback information, the higher value may be increased to a next higher value. The next higher value may be dependent on number of expired feedback timers. Each of the feedback timers may correspond to a respective HARQ process corresponding to a respective UL burst previously transmitted by the first communication node 101 to the second communication node 102.

The adjusting 1001 may thus be based on:

a first number of feedback timers having expired at a time of performing the sensing procedure in the absence of: a) a received UL grant from the second communication node 102, or b) a downlink feedback from the second communication node 102 for an Autonomous Uplink (AUL). Each of the feedback timers may correspond to a respective Hybrid Automatic Repeat reQuest (HARQ), process corresponding to a respective UL burst previously transmitted by the first communication node 101 to the second communication node 102.

The value of the CW may be understood to relate to, e.g., size of the CW. The size may be e.g., in terms of sensing slots, such as 9 us units.

Each feedback timer may run for a number of time units. For example, the time units may be subframes or slots, e.g., 6 subframes, or 6 slots in NR.

The sensing procedure may be e.g., a Cat4 LBT.

Figure 14:
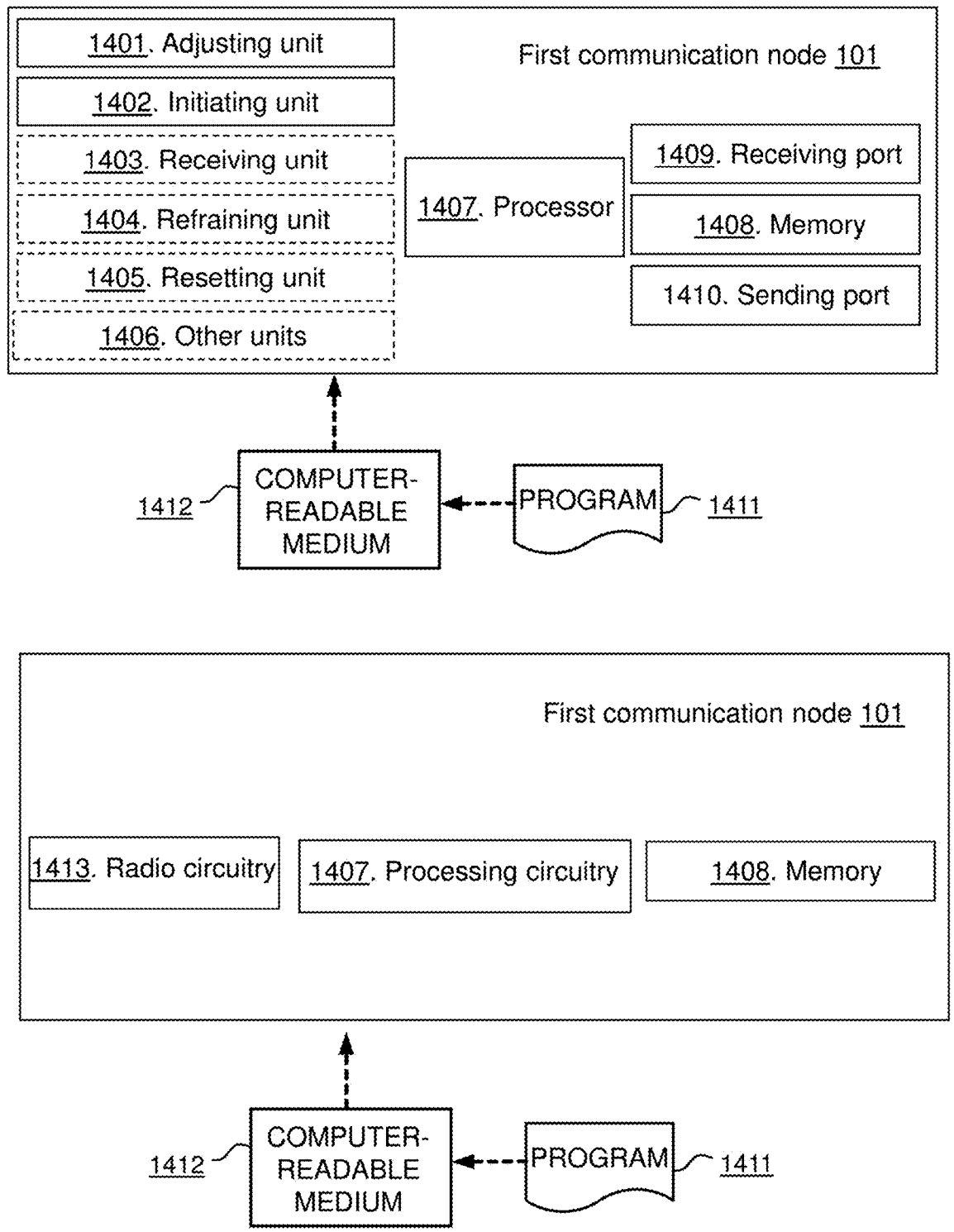
FIG. 14 is a schematic block diagram illustrating two non-limiting examples, a) and b), of a first communication node, according to embodiments herein.

The first communication node 101 may be configured to perform this adjusting 1001 action, e.g. by means of an adjusting unit 1401 as shown in FIG. 14 within the first communication node 101, configured to perform this action. The adjusting unit 1401 may be a processor 1407 of the first communication node 101, or an application running on such processor. The adjusting may be understood herein as changing, or determining.

Figure 11:
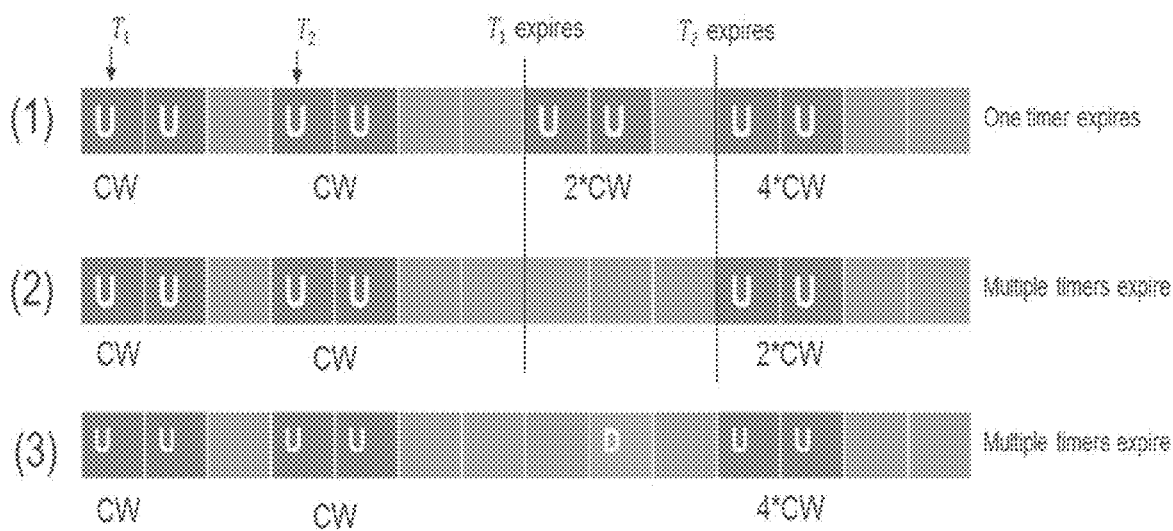
FIG. 11 is a schematic diagram depicting non-limiting examples of the method in a first communication node according to embodiments herein, for the scenario One/Multiple timer expire(s).

Action 1002. The first communication node 101 then, following adjusting the value, initiates the sensing procedure performed prior to the transmission of the UL burst to the second communication node 102, wherein the sensing procedure uses the adjusted value of the CW. Thus, the first communication node 101 may initiate the sensing procedure to be performed prior to the transmission of the UL burst to the second communication node 102, based on the adjusted value of the CW. The first communication node 101 may be configured to perform this initiating action 1002, e.g. by means of an initiating unit 1402, see FIG. 14, within the first communication node 101, configured to perform this action. The initiating unit 1402 may be the processor 1407 of the first communication node 101, or an application running on such processor. The initiating may be understood herein as triggering, starting, or enabling. The transmission of the UL burst may be performed via, e.g., the link 140. The value of the CW may be adjusted for all priority classes at the first communication node 101. In some examples in a first group of examples, at the time of performing the sensing procedure, the first number of feedback timers may have expired in the absence of any downlink transmission from the second communication node 102. The first higher value may then be increased once to a next higher value. A particular example of this is shown in FIG. 11, rows (1) and (2).

In some other examples in the first group of examples, at the at the time of performing the sensing procedure, the first number of feedback timers may have expired, and at least one downlink, DL, transmission may have been received from the second communication node 102. The DL transmission may be devoid of feedback information. The first higher value may then be increased a second number of times to a next higher value. A particular example of this is shown in FIG. 11, row (3).

In some examples in a second group of examples, the CW may have been adjusted, e.g., as per Action 1001, and after the time of performing the sensing procedure and the one or more feedback timers has expired, the method may further comprise the actions of:

Action 1003. The first communication node 101 may receive at least one DL transmission from the second communication node 102 comprising feedback information. The feedback information may be negative for a latest expired timer.

Thus, the first communication node 101 may receive at least one DL transmission from the second communication node 102. The first communication node 101 may be configured to perform this receiving action 1003, e.g., by means of a receiving unit 1403, see FIG. 14, within the first communication node 101, configured to perform this action. The receiving unit 1403 may be the processor 1407 of the first communication node 101, or an application running on such processor.

In some examples, the at least one DL transmission may be at least one first DL transmission from the second communication node 102. The at least one first DL transmission may comprise feedback information. In some examples, the feedback information may be negative for a latest expired timer.

In some embodiments, the method may further comprise the action of:

Action 1004. The first communication node 101 may, with the proviso that the feedback information is negative, use a CW of the second value in a following sensing procedure. The first communication node may e.g. refrain from adjusting the value of the CW, based on the received at least one first DL transmission. The first communication node 101 may be configured to perform this refraining action 1004, e.g. by means of a refraining unit 1404, see FIG. 14, within the first communication node 101, configured to perform this action. The refraining unit 1404 may be the processor 1407 of the first communication node 101, or an application running on such processor.

Figure 13:
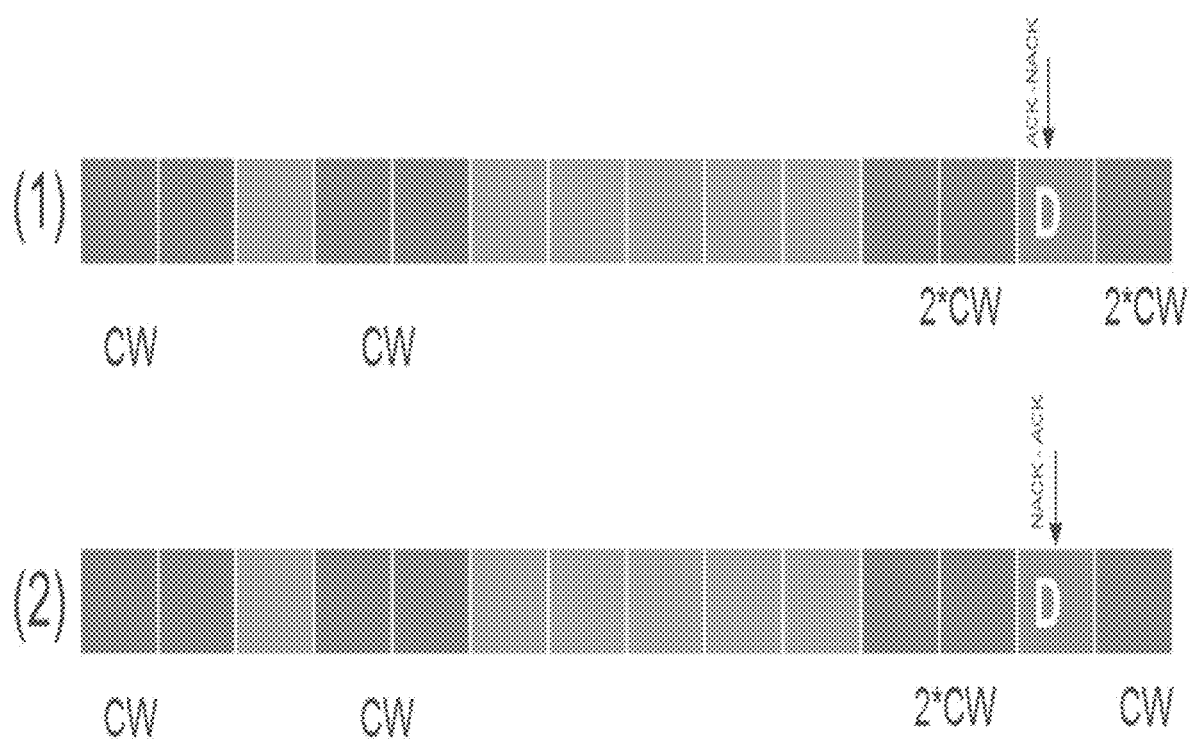
FIG. 13 is a schematic diagram depicting non-limiting examples of the method in a first communication node according to embodiments herein, for the scenario Multiple Timer expire+late feedback.

A particular example of this Action 1003 and Action 1004 is shown in FIG. 13, row (1).

In some other examples in the second group of examples, the CW may have been adjusted, e.g., as per Action 1001, and after the time of performing the sensing procedure and the first number of feedback timers has expired, the method may further comprise the actions of:

Action 1003. Alternatively or additionally to action of receiving negative feedback, the first communication node 101 may receive at least one DL transmission from the second communication node 102 comprising feedback information, wherein the feedback information may be positive for a latest expired timer. Thus, the first communication node 101 may receive the at least one downlink, DL, transmission from the second communication node 102. The first communication node 101 may be configured to perform this receiving action 1003, as stated earlier, e.g. by means of the receiving unit 1403 within the first communication node 101, configured to perform this action.

In some of these other examples in the second group of examples, the at least one DL transmission may be at least one at least one second DL transmission from the second communication node 102. The at least one second DL transmission may comprise feedback information. In some examples, the feedback information may be positive for the latest expired timer.

In some embodiments, the method may further comprise the action of:

Action 1005. The first communication node 101 may, with the proviso that the feedback information is positive, reset the value of the CW, from the second value to the first or a third value. The third value may be a preset minimum value. Thus, the first communication node 101 may e.g. reset the value of the CW, from the second value or e.g. to the third value, based on the received second DL transmission. The first communication node 101 may be configured to perform this resetting action 1005, e.g. by means of a resetting unit 1405, see FIG. 14, within the first communication node 101, configured to perform this action. The resetting unit 1405 may be the processor 1407 of the first communication node 101, or an application running on such processor. The feedback information may be positive when at least one of the following is fulfilled:
 a. all reference subframes are Acknowledged (Acked);
 b. a latest reference subframe is Acked;
 c. more than a set number of reference subframes are Acked;
 d. less than a set number of the reference subframes are Negatively Acknowledged (Nacked);

The reference subframes correspond to subframes wherein the one or more feedback timers were initiated.

A particular example of this is shown in FIG. 13, row (2).

In some embodiments, the received at least one DL transmission may correspond to (be associated with) a HARQ ID linked to the latest expired timer.

In a third group of examples, the resetting 1005 may be performed based on at least one of the following provisos:
 a. all reference subframes are Acknowledged, Acked;
 b. a lastest reference subframe is Acked
 c. more than a third number of the reference subframes are Acked
 d. less than a fourth number of the reference subframes are Negatively Acknowledged, Nacked.

The reference subframes may correspond to subframes wherein the first number of feedback timers were initiated.

Other units 1406 may be comprised in the first communication node 101.

The first communication node 101 may also comprise a client application 3332 or a client application unit, which may be configured to communicate user data with a host application unit in a host computer 3310, e.g., via another link such as 3350.

In FIG. 14, optional units are indicated with dashed boxes.

The first communication node 101 may comprise an interface unit to facilitate communications between the first communication node 101 and other nodes or devices, e.g., the network node 110, the host computer 3310, or any of the other nodes. In some particular examples, the interface may, for example, include a transceiver configured to transmit and receive radio signals over an air interface in accordance with a suitable standard.

Figure 16:
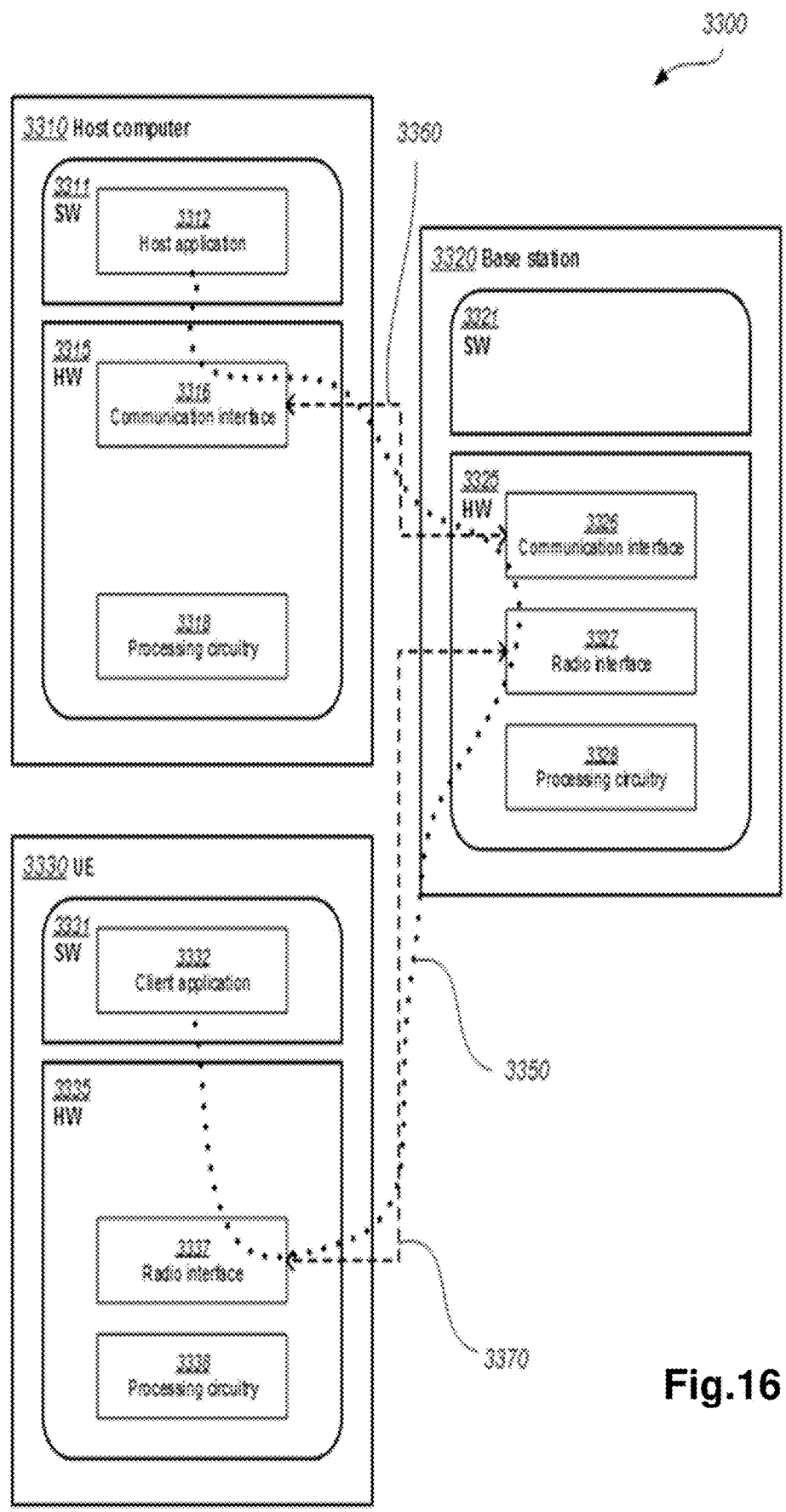
FIG. 16 is a generalized block diagram of a host computer communicating via a base station with a user equipment over a partially wireless connection, according to embodiments herein.

The first communication node 101 may comprise an arrangement as shown in FIG. 14 or in FIG. 16.

Some embodiments herein will now be further described with some non-limiting examples.

In the following description, any reference to a/the UE may be understood to equally refer the first communication node 101; any reference to a/the eNB may be understood to equally refer the second communication node 102; any reference to a/the CAT4 UL burst may be understood to equally refer the UL burst.

One case, yet to be specified, is CW adjustment for the case of no ACK/NACK reception. It has been discussed during previous 3GPP meetings that the wireless device starts a timer with the start of each CAT4 UL burst and may need to react in response to the timer expiry. In here, we provide a detailed description of the methods for handling the CW for the case of no ACK/NACK reception, assuming a timer N=6.

In the examples below the first communication node is exemplified as the wireless device 130 (UE) and the second communication node is exemplified as the network node 110 (eNB), First Group of Examples: One/Multiple Timer Expire(s)

Example 1 in the first group of examples: Before initiating a new CAT4 LBT, if one or multiple timers expire due to no feedback reception, the contention window size of all priority classes at the wireless device is increased to the next higher value as shown in case 1 and 2 of FIG. 11.

In another example in the first group of examples, we differentiate between the two cases:

1. no DL transmissions from the network node 110 at all (case 2 above): can be due to either UL burst(s) missed by the network node 110, or the network node 110 failed to access the channel to send the feedback. As a result, the contention window size of all priority classes at the wireless device 130 is increased once to the next higher value 2. DL transmissions occur but the later do not carry any type of feedback (case 3 above): This can be an indication that the UL burst(s) were missed by the network node 110. As a result, the contention window size of all priority classes at the wireless device 130 is increased 2*X times, where X is the number of expired timers.

Second Group of Examples:Timer Expires+Late Feedback feLAA supports flexible timing relationship between AUL transmission and corresponding UL HARQ feedback. Thereby, it could happen that the wireless device 130 receives a positive "ACK" for the HARQ_ID_ref that was assumed "NACK" after the timer expires, as shown in case 1 of FIG. 12.

The reference subframe is the first subframe of the most recent UL, SUL/AUL, burst of contiguous subframes that is transmitted after performing a category 4 LBT procedure with the following timing:
 At least 4 subframes prior to a UL grant reception or an AUL Downlink feedback information.
 For further study (FFS): multiple reference subframes can be supported.

Figure 12:
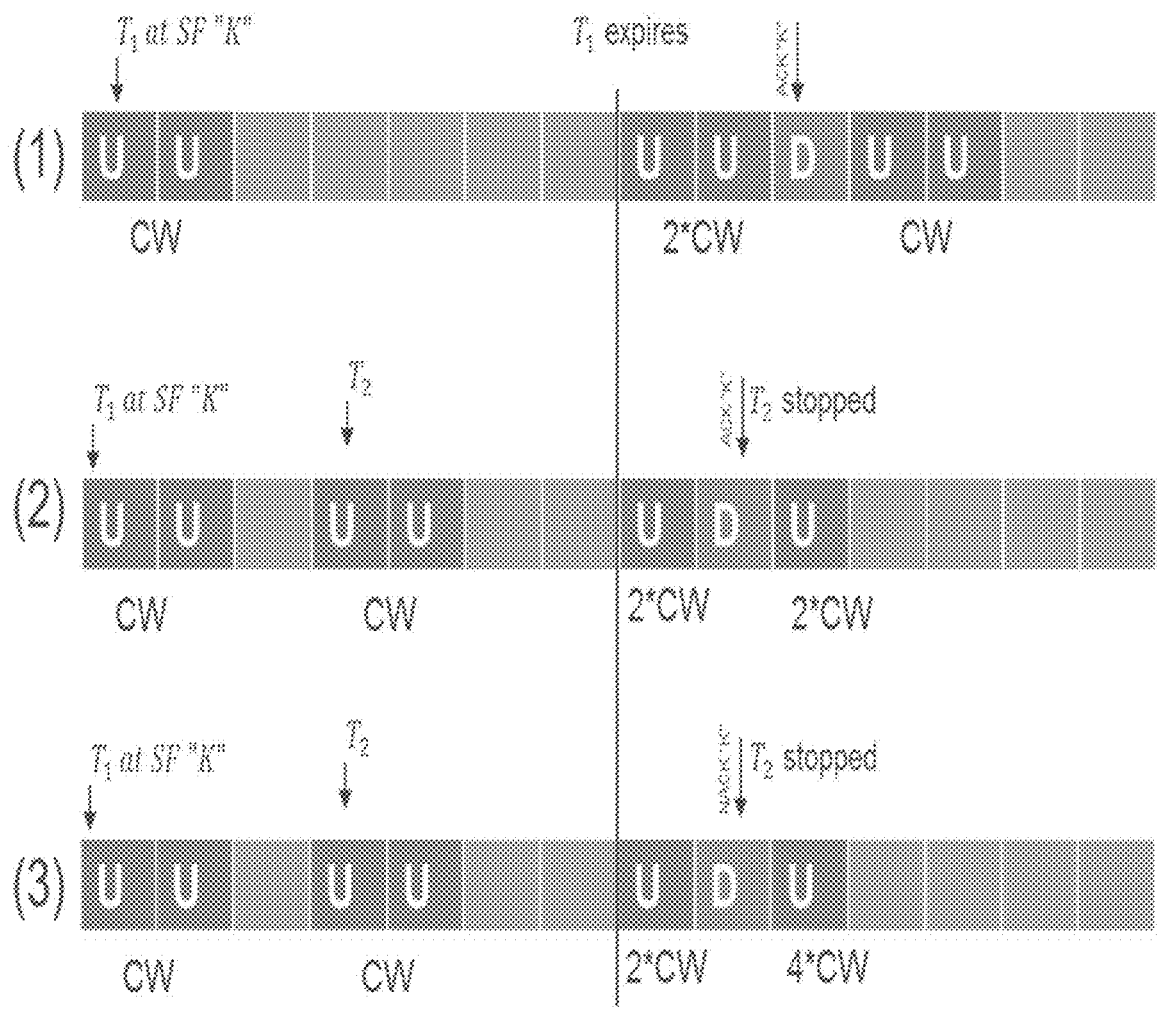
FIG. 12 is a schematic diagram depicting non-limiting examples of the method in a first communication node according to embodiments herein, for the scenario Timer expires+late feedback.

According to the above, the wireless device 130 may reset the contention window after the reception of the "ACK" in case 1 of FIG. 12. However, this is not true for case (2) of FIG. 12. In fact, according to the definition of the reference subframe, the reference subframe for CW adjustment at k+10 would be the transmission at k+3. As a result, the CW at k+10 may need to be doubled from 2*CW to 4*CW. It is not consistent that the CW is increased upon timer expiry but not corrected when the missing information is available. Therefore, upon the reception of the "ACK" in case (2) of FIG. 12, the wireless device 130 may need to reset the CW. Afterwards, before initiating a new CAT4 LBT, the wireless device 130 shall adjust the CW in response of reception of explicit NACK feedback (or presumed NACK) for the reference subframe (k+3).

The reception of the "NACK" in case (3) of FIG. 12, confirms that the decision to double the CW upon T1 expiry was correct, therefore the CW is not reset. Afterwards, before initiating a new CAT4 LBT, the wireless device 130 doubles the CW from 2*CW to 4*CW in response of NACK corresponding to the reference subframe k+3.

Example 2 in the second group of examples: If the wireless device 130 increases the contention to the next higher value due to timer expiry and receives a positive feedback corresponding to the HARQ ID linked the latest expired timer, the wireless device 130 may reset the CW.

Third Group of Examples: Multiple Timer Expire+Late Feedback

This section is an extension of the previous section. The assumption in the above examples is that in:

Case 1 of FIG. 13: subframe "k" Acked, subframe "k+3" Nacked

Case 2 of FIG. 13: subframe "k" Nacked, subframe "k+3" Acked.

The same rule applies as in the case of single timer expiry. The feedback corresponding to the latest expired timer is what reflects the channel situation. That is, the reference subframe is the subframe corresponding to the HARQ ID linked the latest expired timer. Therefore, in case 1 of FIG. 13, the CW is unchanged since k+3 is Nacked, while in case 2 of FIG. 13, the wireless device 130 resets the CW before initializing a new sensing procedure such as CAT4 LBT.

As another example in the third group of examples: The feedback corresponding to all the expired timers are taken in consideration. There will be multiple reference subframes each corresponding to a HARQ id of an expired timer. As non-limiting examples, the CW is reset if:

if all reference subframes are Acked
if lastest reference subframe is Acked
if more than X % of the reference subframes are Acked
if less than Y % of the reference subframes are Nacked Certain embodiments disclosed herein may provide one or more of the following technical advantage(s), which may be summarized as that they provide for methods for contention window adjustment for autonomous UL operation, specifically when there is no feedback for previous Category 4 LBT UL transmissions. The methods define the first communication node 101 behavior that ensures:

efficient and optimized adjustment of the CW;
avoid unnecessary increase of CW.

FIG. 14 depicts two different examples, respectively, of the arrangement that the first communication node 101 may comprise. In some embodiments, the first communication node 101 may comprise the following arrangement depicted in FIG. 14 top.

The embodiments herein in the first communication node 101 may be implemented through one or more processors, such as a processor 1407 in the first communication node 101 depicted in FIG. 14, together with computer program code for performing the functions and actions of the embodiments herein. A processor, as used herein, may be understood to be a hardware component. The program code mentioned above may also be provided as a computer program product, for instance in the form of a data carrier carrying computer program code for performing the embodiments herein when being loaded into the first communication node 101. One such carrier may be in the form of a CD ROM disc. It is however feasible with other data carriers such as a memory stick. The computer program code may furthermore be provided as pure program code on a server and downloaded to the first communication node 101.

The first communication node 101 may further comprise a memory 1408 comprising one or more memory units. The memory 1408 is arranged to be used to store obtained information, store data, configurations, schedulings, and applications etc. to perform the methods herein when being executed in the first communication node 101.

In some embodiments, the first communication node 101 may receive information from, e.g., the second communication node 102, through a receiving port 1409. In some embodiments, the receiving port 1409 may be, for example, connected to one or more antennas in first communication node 101. In other embodiments, the first communication node 101 may receive information from another structure in the wireless communications network 100 through the receiving port 1409. Since the receiving port 1409 may be in communication with the processor 1407, the receiving port 1409 may then send the received information to the processor 1407. The receiving port 1409 may also be configured to receive other information.

The processor 1407 in the first communication node 101 may be further configured to transmit or send information to e.g., the second communication node 102, another structure in the wireless communications network 100, through a sending port 1410, which may be in communication with the processor 1407, and the memory 1408.

Those skilled in the art will also appreciate that the providing unit 1401, the initiating unit 1402, the receiving unit 1403, the refraining unit 1404, the resetting unit 1405, and the other units 1406 described above may refer to a combination of analog and digital circuits, and/or one or more processors configured with software and/or firmware, e.g., stored in memory, that, when executed by the one or more processors such as the processor 1407, perform as described above. One or more of these processors, as well as the other digital hardware, may be included in a single Application-Specific Integrated Circuit (ASIC), or several processors and various digital hardware may be distributed among several separate components, whether individually packaged or assembled into a System-on-a-Chip (SoC).

Also, in some embodiments, the different units 1401-1405 described above may be implemented as one or more applications running on one or more processors such as the processor 1407.

Thus, the methods according to the embodiments described herein for the first communication node 101 may be respectively implemented by means of a computer program 1411 product, comprising instructions, i.e., software code portions, which, when executed on at least one processor 1407, cause the at least one processor 1407 to carry out the actions described herein, as performed by the first communication node 101. The computer program 1411 product may be stored on a computer-readable storage medium 1412. The computer-readable storage medium 1412, having stored thereon the computer program 1411, may comprise instructions which, when executed on at least one processor 1407, cause the at least one processor 1407 to carry out the actions described herein, as performed by the first communication node 101. In some embodiments, the computer-readable storage medium 1412 may be a non-transitory computer-readable storage medium, such as a CD ROM disc, or a memory stick. In other embodiments, the computer program 1411 product may be stored on a carrier containing the computer program 1411 just described, wherein the carrier is one of an electronic signal, optical signal, radio signal, or the computer-readable storage medium 1412, as described above.

The first communication node 101 may comprise a communication interface configured to facilitate communications between the first communication node 101 and other nodes or devices, e.g., the second communication node 102. The interface may, for example, include a transceiver configured to transmit and receive radio signals over an air interface in accordance with a suitable standard.

In other embodiments, the first communication node 101 may comprise the following arrangement depicted in FIG. 14 low. The first communication node 101 may comprise a processing circuitry 1407, e.g., one or more processors such as the processor 1407, in the first communication node 101 and the memory 1408. The first communication node 101 may also comprise a radio circuitry 1413, which may comprise e.g., the receiving port 1409 and the sending port 1410. The processing circuitry 1407 may be configured to, or operable to, perform the method actions according to FIG. 10, and/or FIGS. 33-37, in a similar manner as that described in relation to FIG. 14 top. The radio circuitry 1413 may be configured to set up and maintain at least a wireless connection with the first communication node 101. Circuitry may be understood herein as a hardware component.

Hence, embodiments herein also relate to the first communication node 101 operative to operate in the wireless communications network 100. The first communication node 101 may comprise the processing circuitry 1407 and the memory 1408, said memory 1408 containing instructions executable by said processing circuitry 1407, whereby the first communication node 101 is further operative to perform the actions described herein in relation to the first communication node 101, e.g., in FIG. 10, and/or FIG. 15-20.

Further Extensions And Variations

Figure 15:
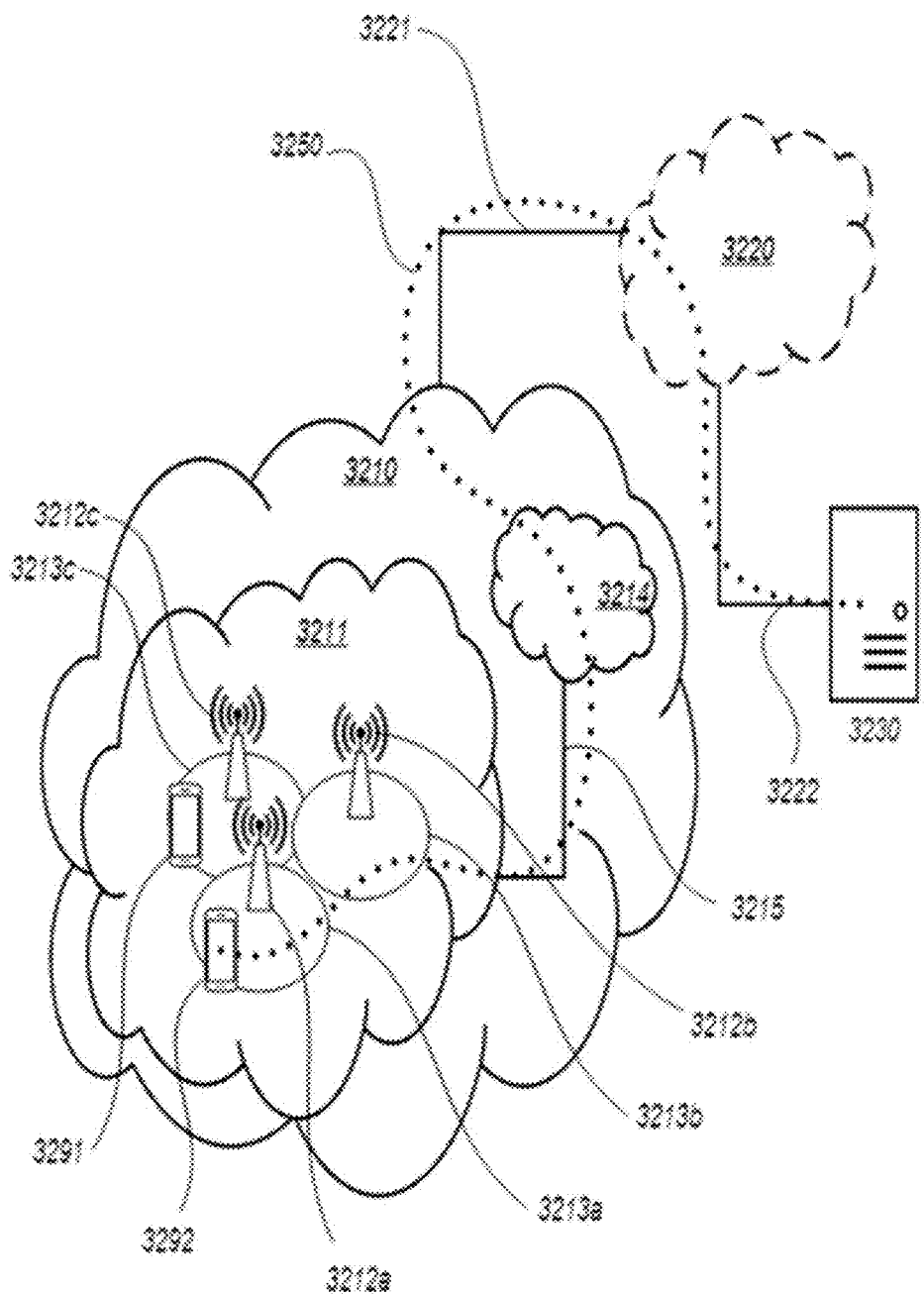
FIG. 15 is a schematic block diagram illustrating a telecommunication network connected via an intermediate network to a host computer, according to embodiments herein.

FIG. 15: Telecommunication network connected via an intermediate network to a host computer in accordance with some embodiments With reference to FIG. 15, in accordance with an embodiment, a communication system includes telecommunication network 3210 such as the wireless communications network 100, for example, a 3GPP-type cellular network, which comprises access network 3211, such as a radio access network, and core network 3214. Access network 3211 comprises a plurality of network nodes such as the second communication node 102. For example, base stations 3212*a*, 3212*b*, 3212*c*, such as NBs, eNBs, gNBs or other types of wireless access points, each defining a corresponding coverage area 3213*a*, 3213*b*, 3213*c*. Each base station 3212*a*, 3212*b*, 3212*c* is connectable to core network 3214 over a wired or wireless connection 3215. In FIG. 15, a first UE 3291 located in coverage area 3213*c* is configured to wirelessly connect to, or be paged by, the corresponding base station 3212*c*. A second UE 3292 in coverage area 3213*a* is wirelessly connectable to the corresponding base station 3212*a*. While a plurality of UEs 3291, 3292 are illustrated in this example, the disclosed embodiments are equally applicable to a situation where a sole UE is in the coverage area or where a sole UE is connecting to the corresponding base station 3212. Any of the UEs 3291, 3292 may be considered examples of the first communication node 101.

Telecommunication network 3210 is itself connected to host computer 3230, which may be embodied in the hardware and/or software of a standalone server, a cloud-implemented server, a distributed server or as processing resources in a server farm. Host computer 3230 may be under the ownership or control of a service provider, or may be operated by the service provider or on behalf of the service provider. Connections 3221 and 3222 between telecommunication network 3210 and host computer 3230 may extend directly from core network 3214 to host computer 3230 or may go via an optional intermediate network 3220. Intermediate network 3220 may be one of, or a combination of more than one of, a public, private or hosted network; intermediate network 3220, if any, may be a backbone network or the Internet; in particular, intermediate network 3220 may comprise two or more sub-networks (not shown).

The communication system of FIG. 15 as a whole enables connectivity between the connected UEs 3291, 3292 and host computer 3230. The connectivity may be described as an over-the-top (OTT) connection 3250. Host computer 3230 and the connected UEs 3291, 3292 are configured to communicate data and/or signaling via OTT connection 3250, using access network 3211, core network 3214, any intermediate network 3220 and possible further infrastructure (not shown) as intermediaries. OTT connection 3250 may be transparent in the sense that the participating communication devices through which OTT connection 3250 passes are unaware of routing of uplink and downlink communications. For example, base station 3212 may not or need not be informed about the past routing of an incoming downlink communication with data originating from host computer 3230 to be forwarded (e.g., handed over) to a connected UE 3291. Similarly, base station 3212 need not be aware of the future routing of an outgoing uplink communication originating from the UE 3291 towards the host computer 3230.

In relation to FIGS. 16, 17, 18, 19, and 20, which are described next, it may be understood that a UE is an example of the first communication node 101, and that any description provided for the UE equally applies to the first communication node 101. It may be also understood that the base station may be considered an example of the second communication node 102, and that any description provided for the base station equally applies to the second communication node 102.

FIG. 16: Host computer communicating via a base station with a user equipment over a partially wireless connection in accordance with some embodiments Example implementations, in accordance with an embodiment, of the first communication node 101, e.g., a UE, and the second communication node 102, e.g., a base station and host computer discussed in the preceding paragraphs will now be described with reference to FIG. 16. In communication system 3300, such as the wireless communications network 100, host computer 3310 comprises hardware 3315 including communication interface 3316 configured to set up and maintain a wired or wireless connection with an interface of a different communication device of communication system 3300. Host computer 3310 further comprises processing circuitry 3318, which may have storage and/or processing capabilities. In particular, processing circuitry 3318 may comprise one or more programmable processors, application-specific integrated circuits, field programmable gate arrays or combinations of these (not shown) adapted to execute instructions. Host computer 3310 further comprises software 3311, which is stored in or accessible by host computer 3310 and executable by processing circuitry 3318. Software 3311 includes host application 3312. Host application 3312 may be operable to provide a service to a remote user, such as UE 3330 connecting via OTT connection 3350 terminating at UE 3330 and host computer 3310. In providing the service to the remote user, host application 3312 may provide user data which is transmitted using OTT connection 3350.

Communication system 3300 further includes the second communication node 102, exemplified in FIG. 16 as a base station 3320 provided in a telecommunication system and comprising hardware 3325 enabling it to communicate with host computer 3310 and with UE 3330. Hardware 3325 may include communication interface 3326 for setting up and maintaining a wired or wireless connection with an interface of a different communication device of communication system 3300, as well as radio interface 3327 for setting up and maintaining at least wireless connection 3370 with the first communication node 101, exemplified in FIG. 16 as a UE 3330 located in a coverage area (not shown in FIG. 16) served by base station 3320. Communication interface 3326 may be configured to facilitate connection 3360 to host computer 3310. Connection 3360 may be direct or it may pass through a core network (not shown in FIG. 16) of the telecommunication system and/or through one or more intermediate networks outside the telecommunication system. In the embodiment shown, hardware 3325 of base station 3320 further includes processing circuitry 3328, which may comprise one or more programmable processors, application-specific integrated circuits, field programmable gate arrays or combinations of these (not shown) adapted to execute instructions. Base station 3320 further has software 3321 stored internally or accessible via an external connection.

Communication system 3300 further includes UE 3330 already referred to. Its hardware 3335 may include radio interface 3337 configured to set up and maintain wireless connection 3370 with a base station serving a coverage area in which UE 3330 is currently located. Hardware 3335 of UE 3330 further includes processing circuitry 3338, which may comprise one or more programmable processors, application-specific integrated circuits, field programmable gate arrays or combinations of these (not shown) adapted to execute instructions. UE 3330 further comprises software 3331, which is stored in or accessible by UE 3330 and executable by processing circuitry 3338. Software 3331 includes client application 3332. Client application 3332 may be operable to provide a service to a human or non-human user via UE 3330, with the support of host computer 3310. In host computer 3310, an executing host application 3312 may communicate with the executing client application 3332 via OTT connection 3350 terminating at UE 3330 and host computer 3310. In providing the service to the user, client application 3332 may receive request data from host application 3312 and provide user data in response to the request data. OTT connection 3350 may transfer both the request data and the user data. Client application 3332 may interact with the user to generate the user data that it provides.

It is noted that host computer 3310, base station 3320 and UE 3330 illustrated in FIG. 16 may be similar or identical to host computer 3230, one of base stations 3212a, 3212b, 3212c and one of UEs 3291, 3292 of FIG. 15, respectively. This is to say, the inner workings of these entities may be as shown in FIG. 16 and independently, the surrounding network topology may be that of FIG. 15.

In FIG. 16, OTT connection 3350 has been drawn abstractly to illustrate the communication between host computer 3310 and UE 3330 via base station 3320, without explicit reference to any intermediary devices and the precise routing of messages via these devices. Network infrastructure may determine the routing, which it may be configured to hide from UE 3330 or from the service provider operating host computer 3310, or both. While OTT connection 3350 is active, the network infrastructure may further take decisions by which it dynamically changes the routing (e.g., on the basis of load balancing consideration or reconfiguration of the network).

Wireless connection 3370 between UE 3330 and base station 3320 is in accordance with the teachings of the embodiments described throughout this disclosure. One or more of the various embodiments improve the performance of OTT services provided to UE 3330 using OTT connection 3350, in which wireless connection 3370 forms the last segment. More precisely, the teachings of these embodiments may improve the spectrum efficiency when accessing the channel, and reduce latency, and thereby provide benefits such as reduced user waiting time, better responsiveness and extended battery lifetime.

A measurement procedure may be provided for the purpose of monitoring data rate, latency and other factors on which the one or more embodiments improve. There may further be an optional network functionality for reconfiguring OTT connection 3350 between host computer 3310 and UE 3330, in response to variations in the measurement results. The measurement procedure and/or the network functionality for reconfiguring OTT connection 3350 may be implemented in software 3311 and hardware 3315 of host computer 3310 or in software 3331 and hardware 3335 of UE 3330, or both. In embodiments, sensors (not shown) may be deployed in or in association with communication devices through which OTT connection 3350 passes; the sensors may participate in the measurement procedure by supplying values of the monitored quantities exemplified above, or supplying values of other physical quantities from which software 3311, 3331 may compute or estimate the monitored quantities. The reconfiguring of OTT connection 3350 may include message format, retransmission settings, preferred routing etc.; the reconfiguring need not affect base station 3320, and it may be unknown or imperceptible to base station 3320. Such procedures and functionalities may be known and practiced in the art. In certain embodiments, measurements may involve proprietary UE signaling facilitating host computer 3310's measurements of throughput, propagation times, latency and the like. The measurements may be implemented in that software 3311 and 3331 causes messages to be transmitted, in particular empty or 'dummy' messages, using OTT connection 3350 while it monitors propagation times, errors etc.

FIG. 17: Methods implemented in a communication system including a host computer, a base station and a user equipment in accordance with some embodiments FIG. 17 is a flowchart illustrating a method implemented in a communication system, in accordance with one embodiment. The communication system includes a host computer, a base station and a UE which may be those described with reference to FIGS. 15 and 16. For simplicity of the present disclosure, only drawing references to FIG. 17 will be included in this section. In step 3410, the host computer provides user data. In substep 3411 (which may be optional) of step 3410, the host computer provides the user data by executing a host application. In step 3420, the host computer initiates a transmission carrying the user data to the UE. In step 3430 (which may be optional), the base station transmits to the UE the user data which was carried in the transmission that the host computer initiated, in accordance with the teachings of the embodiments described throughout this disclosure. In step 3440 (which may also be optional), the UE executes a client application associated with the host application executed by the host computer.

FIG. 18: Methods implemented in a communication system including a host computer, a base station and a user equipment in accordance with some embodiments FIG. 18 is a flowchart illustrating a method implemented in a communication system, in accordance with one embodiment. The communication system includes a host computer, a base station and a UE which may be those described with reference to FIGS. 15 and 16. For simplicity of the present disclosure, only drawing references to FIG. 18 will be included in this section. In step 3510 of the method, the host computer provides user data. In an optional substep (not shown) the host computer provides the user data by executing a host application. In step 3520, the host computer initiates a transmission carrying the user data to the UE. The transmission may pass via the base station, in accordance with the teachings of the embodiments described throughout this disclosure. In step 3530 (which may be optional), the UE receives the user data carried in the transmission.

FIG. 19: Methods implemented in a communication system including a host computer, a base station and a user equipment in accordance with some embodiments FIG. 19 is a flowchart illustrating a method implemented in a communication system, in accordance with one embodiment. The communication system includes a host computer, a base station and a UE which may be those described with reference to FIGS. 15 and 16. For simplicity of the present disclosure, only drawing references to FIG. 19 will be included in this section. In step 3610 (which may be optional), the UE receives input data provided by the host computer. Additionally or alternatively, in step 3620, the UE provides user data. In substep 3621 (which may be optional) of step 3620, the UE provides the user data by executing a client application. In substep 3611 (which may be optional) of step 3610, the UE executes a client application which provides the user data in reaction to the received input data provided by the host computer. In providing the user data, the executed client application may further consider user input received from the user. Regardless of the specific manner in which the user data was provided, the UE initiates, in substep 3630 (which may be optional), transmission of the user data to the host computer. In step 3640 of the method, the host computer receives the user data transmitted from the UE, in accordance with the teachings of the embodiments described throughout this disclosure.

FIG. 20: Methods implemented in a communication system including a host computer, a base station and a user equipment in accordance with some embodiments FIG. 20 is a flowchart illustrating a method implemented in a communication system, in accordance with one embodiment. The communication system includes a host computer, a base station and a UE which may be those described with reference to FIGS. 15 and 16. For simplicity of the present disclosure, only drawing references to FIG. 20 will be included in this section. In step 3710 (which may be optional), in accordance with the teachings of the embodiments described throughout this disclosure, the base station receives user data from the UE. In step 3720 (which may be optional), the base station initiates transmission of the received user data to the host computer. In step 3730 (which may be optional), the host computer receives the user data carried in the transmission initiated by the base station.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

Further Numbered Embodiments

21. A user equipment (UE) configured to communicate with a base station, the UE comprising a radio interface and processing circuitry configured to perform one or more of the actions described herein as performed by the first communication node 101.

25. A communication system including a host computer comprising:
 processing circuitry configured to provide user data; and
 a communication interface configured to forward user data to a cellular network for transmission to a user equipment (UE),
 wherein the UE comprises a radio interface and processing circuitry, the UE's processing circuitry configured to perform one or more of the actions described herein as performed by the first communication node 101.

26. The communication system of embodiment 25, further including the UE.

27. The communication system of embodiment 26, wherein the cellular network further includes a base station configured to communicate with the UE.

28. The communication system of embodiment 26 or 27, wherein:
 the processing circuitry of the host computer is configured to execute a host application, thereby providing the user data; and
 the UE's processing circuitry is configured to execute a client application associated with the host application.

31. A method implemented in a user equipment (UE), comprising one or more of the actions described herein as performed by the first communication node 101.

35. A method implemented in a communication system including a host computer, a base station and a user equipment (UE), the method comprising:
    at the host computer, providing user data; and
    at the host computer, initiating a transmission carrying the user data to the UE via a cellular network comprising the base station, wherein the UE performs one or more of the actions described herein as performed by the first communication node 101.

36. The method of embodiment 35, further comprising:
    at the UE, receiving the user data from the base station.

41. A user equipment (UE) configured to communicate with a base station, the UE comprising a radio interface and processing circuitry configured to perform one or more of the actions described herein as performed by the first communication node 101.

45. A communication system including a host computer comprising:
    a communication interface configured to receive user data originating from a transmission from a user equipment (UE) to a base station,
    wherein the UE comprises a radio interface and processing circuitry, the UE's processing circuitry configured to: perform one or more of the actions described herein as performed by the first communication node 101.

46. The communication system of embodiment 45, further including the UE.

47. The communication system of embodiment 46, further including the base station, wherein the base station comprises a radio interface configured to communicate with the UE and a communication interface configured to forward to the host computer the user data carried by a transmission from the UE to the base station.

48. The communication system of embodiment 46 or 47, wherein:
    the processing circuitry of the host computer is configured to execute a host application; and
    the UE's processing circuitry is configured to execute a client application associated with the host application, thereby providing the user data.

49. The communication system of embodiment 46 or 47, wherein:
    the processing circuitry of the host computer is configured to execute a host application, thereby providing request data; and
    the UE's processing circuitry is configured to execute a client application associated with the host application, thereby providing the user data in response to the request data.

51. A method implemented in a user equipment (UE), comprising one or more of the actions described herein as performed by the first communication node 101.

52. The method of embodiment 51, further comprising:
    providing user data; and
    forwarding the user data to a host computer via the transmission to the base station.

55. A method implemented in a communication system including a host computer, a base station and a user equipment (UE), the method comprising:
    at the host computer, receiving user data transmitted to the base station from the UE, wherein the UE performs one or more of the actions described herein as performed by the first communication node 101.

56. The method of embodiment 55, further comprising:
    at the UE, providing the user data to the base station.

57. The method of embodiment 56, further comprising:
    at the UE, executing a client application, thereby providing the user data to be transmitted; and
    at the host computer, executing a host application associated with the client application.

58. The method of embodiment 56, further comprising:
    at the UE, executing a client application; and
    at the UE, receiving input data to the client application, the input data being provided at the host computer by executing a host application associated with the client application,
    wherein the user data to be transmitted is provided by the client application in response to the input data.

75. A method implemented in a communication system including a host computer, a base station and a user equipment (UE), the method comprising:
    at the host computer, receiving, from the base station, user data originating from a transmission which the base station has received from the UE, wherein the UE performs one or more of the actions described herein as performed by the first communication node 101.

76. The method of embodiment 75, further comprising:
    at the base station, receiving the user data from the UE.

77. The method of embodiment 76, further comprising:
    at the base station, initiating a transmission of the received user data to the host computer.

Abbreviations

At least some of the following abbreviations may be used in this disclosure. If there is an inconsistency between abbreviations, preference should be given to how it is used above. If listed multiple times below, the first listing should be preferred over any subsequent listing(s).
3GPP 3rd Generation Partnership Project
5G 5th Generation
DL Downlink
eNB E-UTRAN NodeB
E-UTRA Evolved UTRA
E-UTRAN Evolved UTRAN
GERAN GSM EDGE Radio Access Network
gNB Base station in NR
GSM Global System for Mobile communication
HSPA High Speed Packet Access
LTE Long-Term Evolution
OFDM Orthogonal Frequency Division Multiplexing
UE User Equipment
UL Uplink
UMTS Universal Mobile Telecommunication System
UTRA Universal Terrestrial Radio Access
UTRAN Universal Terrestrial Radio Access Network
WCDMA Wide CDMA
WLAN Wide Local Area Network
BSR Buffer Status Request
CC Component Carrier
CCA Clear Channel Assessment
CQI Channel Quality Information
CRC Cyclic Redundancy Check
DCI Downlink Control Information
DL Downlink
DMTC DRS Measurement Timing Configuration
DRS Discovery Reference Signal
eNB evolved NodeB, base station
UE User Equipment
UL Uplink LAA Licensed-Assisted Access
SCell Secondary Cell
STA Station
LBT Listen-before-talk
LTE-U LTE in Unlicensed Spectrum
PDCCH Physical Downlink Control Channel
PMI Precoding Matrix Indicator
PUSCH Physical Uplink Shared Channel
RAT Radio Access Technology
RNTI Radio Network Temporary Identifier
TXOP Transmission Opportunity
UL Uplink

REFERENCES

3GPP TS 36.211, V12.3.0 (2014-09), 3rd Generation Partnership Project; Technical Specification Group Radio Access Network; Evolved Universal Terrestrial Radio Access (E-UTRA); Physical Channels and Modulation, Release 12

3GPP TS 36.213, V12.3.0 (2014-09), 3rd Generation Partnership Project; Technical Specification Group Radio Access Network; Evolved Universal Terrestrial Radio Access (E-UTRA); Physical layer procedures, Release 12

3GPP TS 36.212, V12.6.0 (2015-03), 3rd Generation Partnership Project; Technical Specification Group Radio Access Network; Evolved Universal Terrestrial Radio Access (E-UTRA); Radio Resource Control (RRC), Release 3GPP TS 36.321, V12.1.0 (2014-03), 3rd Generation Partnership Project; Technical Specification Group Radio Access Network; Evolved Universal Terrestrial Radio Access (E-UTRA); Medium Access Control (MAC) protocol specification, Release 12

The invention claimed is:

1. A method, performed by a first communication node operating in a wireless communications network, the method comprising:
adjusting a value of a Contention Window, CW, from a first value to a second value, adjusting the value being based on:
at least one feedback timer having expired at a time of performing a sensing procedure in the absence of a grant and a downlink feedback from a second communication node; and
following adjusting the value:
initiating a sensing procedure performed prior to a transmission of an uplink, UL, burst to the second communication node, the sensing procedure using the adjusted value of the CW;
after the time of performing the sensing procedure and the at least one feedback timer has expired:
receiving at least one downlink, DL, transmission from the second communication node comprising feedback information, the feedback information being positive for a latest expired timer; and
resetting the value of the CW, from the second value to a third value when the feedback information is positive.

2. The method according to claim 1, wherein the value of the CW is adjusted for all priority classes at the first communication node.

3. The method according to claim 1, wherein at the time of performing the sensing procedure, the at least one feedback timer has expired in the absence of any downlink transmission from the second communication node, and wherein the higher value is increased once to a next higher value.

4. The method according to claim 1, wherein at the time of performing the sensing procedure, the at least one feedback timer has expired, and the at least one downlink, DL, transmission has been received from the second communication node, the at least one DL transmission being devoid of feedback information, the higher value being increased to a next higher value, the next higher value being dependent on a number of expired feedback timers.

5. The method according to claim 1, wherein after the time of performing the sensing procedure and the at least one feedback timer has expired, the method further comprises:
receiving the at least one downlink, DL, transmission from the second communication node comprising the feedback information, the feedback information being negative for a latest expired timer; and
using a CW of the second value in a following sensing procedure when the feedback information is negative.

6. The method according to claim 1, wherein the third value is a preset minimum value.

7. The method according to claim 6, wherein:
the feedback information is positive when at least one of the following is fulfilled:
a plurality of reference subframes are Acknowledged, Acked, the plurality of reference subframes being associated with the operating in the wireless communications network;
a latest reference subframe of the plurality of reference subframes is Acked;
more than a set number of reference subframes of the plurality of reference subframes are Acked;
less than the set number of the reference subframes of the plurality of reference subframes are Negatively Acknowledged, Nacked;
wherein at least one reference subframe of the plurality of reference subframes corresponds to at least another subframe associated with the at least one feedback timer, the at least one feedback timer being initiated.

8. The method according to claim 5, wherein the received at least one DL transmission is associated with a HARQ Identifier, ID, linked to the latest expired timer.

9. The method according to claim 1, wherein each of the feedback timers corresponds to a respective Hybrid Automatic Repeat reQuest, HARQ, process corresponding to a respective UL burst previously transmitted by the first communication node to the second communication node.

10. A first communication node configured to operate in a wireless communications network, the first communication node comprising processing circuitry being configured to:
adjust a value of a Contention Window, CW, from a first value to a second value, adjustment of the value being based on:
at least one feedback timer having expired at a time of performing a sensing procedure in the absence of a grant and a downlink feedback from a second communication node; and
following adjusting the value, configured to:
initiate the sensing procedure performed prior to a transmission of an uplink, UL, burst to the second communication node, the sensing procedure using the adjusted value of the CW;
after the time of performing the sensing procedure and the at least one feedback timer has expired:

receive at least one downlink, DL, transmission from the second communication node comprising feedback information, the feedback information being positive for a latest expired timer; and reset the value of the CW, from the second value to a third value when the feedback information is positive.

11. The first communication node according to claim 10, wherein the value of the CW is adjusted for all priority classes at the first communication node.

12. The first communication node according to claim 10, wherein at the time of performing the sensing procedure, the at least one feedback timer has expired in the absence of any downlink transmission from the second communication node, and wherein the higher value is increased once to a next higher value.

13. The first communication node according to claim 10, wherein at the time of performing the sensing procedure, the at least one feedback timer has expired, and the at least one downlink, DL, transmission has been received from the second communication node, the at least one DL transmission being devoid of feedback information, the higher value being increased to a next higher value, the next higher value being dependent on a number of expired feedback timers.

14. The first communication node according to claim 10, wherein after the time of performing the sensing procedure and the at least one feedback timer has expired, the first communication node is further configured to:

receive the at least one downlink, DL, transmission from the second communication node comprising the feedback information, the feedback information being negative for a latest expired timer;

use the CW of the second value in a following sensing procedure when the feedback information is negative.

15. The first communication node according to claim 10, wherein the third value is a preset minimum value.

16. The first communication node according to claim 15, wherein:

the feedback information is positive when at least one of the following is fulfilled:

a plurality of reference subframes are Acknowledged, Acked, the plurality of reference subframes being associated with the operating in the wireless communications network;

a latest reference subframe of the plurality of reference subframes is Acked;

more than a set number of reference subframes of the plurality of reference subframes are Acked;

less than the set number of the reference subframes of the plurality of reference subframes are Negatively Acknowledged, Nacked;

wherein at least one reference subframe of the plurality of reference subframes corresponds to at least another subframe associated with the at least one feedback timer, the at least one feedback timer being initiated.

17. The first communication node according to claim 14, wherein the received at least one DL transmission is associated with a HARQ Identifier, ID, linked to the latest expired timer.

18. The first communication node according to claim 10, wherein each of the feedback timers corresponds to a respective Hybrid Automatic Repeat reQuest, HARQ, process corresponding to a respective UL burst previously transmitted by the first communication node to the second communication node.

19. A non-transitory computer-readable storage medium, having stored thereon a computer program product comprising instructions which, when executed on at least one processor, cause the at least one processor to carry out a method performed by a first communication node operating in a wireless communications network, the method comprising:

adjusting a value of a Contention Window, CW, from a first value to a second value, adjusting the value being based on:

at least one feedback timer having expired at a time of performing a sensing procedure in the absence of a grant and a downlink feedback from a second communication node; and following adjusting the value:

initiating a sensing procedure performed prior to a transmission of an uplink, UL, burst to the second communication node, the sensing procedure using the adjusted value of the CW;

after the time of performing the sensing procedure and the at least one feedback timer has expired:

receiving at least one downlink, DL, transmission from the second communication node comprising feedback information, the feedback information being positive for a latest expired timer; and resetting the value of the CW, from the second value to a third value when the feedback information is positive.

* * * * *

UNITED STATES PATENT AND TRADEMARK OFFICE
CERTIFICATE OF CORRECTION

PATENT NO. : 11,843,938 B2
APPLICATION NO. : 17/867186
DATED : December 12, 2023
INVENTOR(S) : Karaki et al.

It is certified that error appears in the above-identified patent and that said Letters Patent is hereby corrected as shown below:

In the Specification

In Column 5, Line 12, delete "symbol" and insert -- signal --, therefor.

In Column 5, Line 53, delete "where by" and insert -- whereby --, therefor.

In Column 5, Line 55, delete "group" and insert -- grouped --, therefor.

In Column 12, Line 23, delete "no" and insert -- of no --, therefor.

In Column 15, Line 36, delete "9 us" and insert -- 9 µs --, therefor.

In Column 20, Lines 12-13, delete "CD ROM" and insert -- CD-ROM --, therefor.

In Column 21, Lines 9-10, delete "CD ROM" and insert -- CD-ROM --, therefor.

In Column 28, Line 54, delete "Wide" and insert -- Wideband --, therefor.

In Column 28, Line 55, delete "Wide" and insert -- Wireless --, therefor.

In Column 29, Line 30, delete "Release" and insert -- Release 12. --, therefor.

Signed and Sealed this
Eighteenth Day of June, 2024

Katherine Kelly Vidal
*Director of the United States Patent and Trademark Office*